US007948583B2

United States Patent
Minato et al.

(10) Patent No.: US 7,948,583 B2
(45) Date of Patent: May 24, 2011

(54) COLOR FILTER, COLORING COMPOSITION FOR COLOR FILTER AND LIQUID CRYSTAL DISPLAY DEVICE

(75) Inventors: Koichi Minato, Tokyo (JP); Mie Shimizu, Tokyo (JP); Hidesato Hagiwara, Tokyo (JP); Sohei Kadota, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 268 days.

(21) Appl. No.: 12/010,871

(22) Filed: Jan. 30, 2008

(65) Prior Publication Data

US 2008/0180611 A1 Jul. 31, 2008

(30) Foreign Application Priority Data

Jan. 31, 2007 (JP) .................................. 2007-021897

(51) Int. Cl.
 *G02F 1/133* (2006.01)
 *G02F 1/1335* (2006.01)

(52) U.S. Cl. ........................................ 349/106; 349/117

(58) Field of Classification Search .......... 349/106–109, 349/117–121
See application file for complete search history.

(56) References Cited

U.S. PATENT DOCUMENTS

| 5,561,539 | A * | 10/1996 | Funahata et al. ................ 349/70 |
| 6,169,590 | B1 * | 1/2001 | Abileah et al. ................ 349/120 |
| 2005/0213003 | A1 * | 9/2005 | Kaneko ......................... 349/114 |
| 2007/0252927 | A1 * | 11/2007 | Ichihashi et al. .............. 349/106 |
| 2007/0285602 | A1 | 12/2007 | Takeda et al. |
| 2008/0143935 | A1 * | 6/2008 | Akao et al. .................... 349/106 |
| 2008/0284957 | A1 * | 11/2008 | Haruta et al. ................. 349/117 |
| 2009/0257007 | A1 * | 10/2009 | Minato et al. ................. 349/106 |

FOREIGN PATENT DOCUMENTS

| JP | 2000-136253 | 5/2000 |
| JP | 2001-242460 | 9/2001 |

* cited by examiner

*Primary Examiner* — Akim E Ullah

(57) ABSTRACT

A coloring composition for a color filter, which includes a transparent resin, an organic pigment dispersed in the transparent resin, and a retardation-regulating agent containing a compound which is capable of increasing a retardation. A color filter which is provided with colored pixels formed on a transparent substrate by using this coloring composition. A liquid crystal display device which is provided with this color filter.

5 Claims, 1 Drawing Sheet

Figure 1:
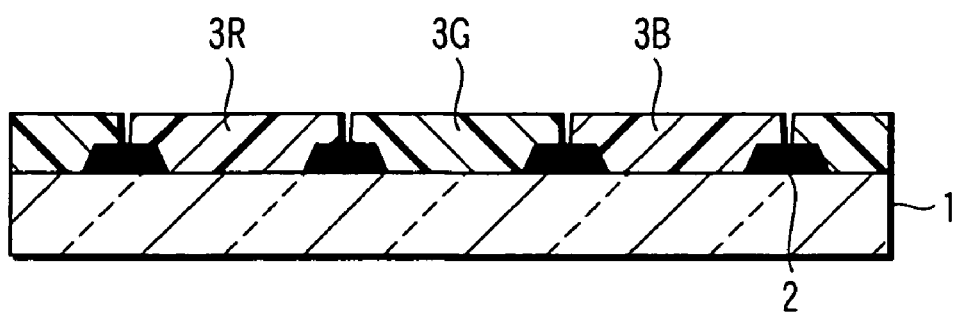

COLOR FILTER, COLORING COMPOSITION FOR COLOR FILTER AND LIQUID CRYSTAL DISPLAY DEVICE

CROSS-REFERENCE TO RELATED APPLICATIONS

This application is based upon and claims the benefit of priority from prior Japanese Patent Application No. 2007-021897, filed Jan. 31, 2007, the entire contents of which are incorporated herein by reference.

BACKGROUND OF THE INVENTION

1. Field of the Invention

This invention relates to a coloring composition for creating a color filter, enabling the perpendicular (thickness-wise) optical retardation of each of color pixels to be adjusted to become optimal, a color filter wherein the perpendicular optical retardation of each of color pixels is optimized, and a liquid crystal display device which is provided with such a color filter.

2. Description of the Related Art

A liquid crystal display device is a display device wherein the birefringence of liquid crystal molecules is utilized and which is constituted by a liquid crystal cell, a polarizing element and an optical compensating layer. This liquid crystal display device is roughly classified, depending on the kind of light source, into a transmissive type liquid crystal display device, in which the light source is installed inside the device, and a reflection type liquid crystal display device, in which an external light source is utilized.

The transmissive type liquid crystal display device is constructed such that two polarizing elements are mounted on the opposite sides of the liquid crystal cell, and one or two optical compensating layers are interposed between the liquid crystal cell and the polarizing element.

On the other hand, the reflection type liquid crystal display device is constructed such that a reflective plate, a liquid crystal cell, an optical compensation layer and a polarizing element layer are successively arrayed in the mentioned order. The liquid crystal cell is constructed such that orientated bar-like liquid crystalline molecules are sandwiched between two substrates and that as a voltage is applied to electrode layer(s) which is (are) disposed on the opposite sides or one side of the substrates, and the aligned state of bar-like liquid crystalline molecules is caused to change, thereby making it possible to perform the switching of the transmission/shielding of light.

Depending on the alignment of the bar-like liquid crystalline molecules, the liquid crystal cell is permitted to take various display modes, such as TN (Twisted Nematic), IPS (In-Plane Switching), FLC (Ferroelectric Liquid Crystal), OCB (Optically Compensated Bend), STN (Supper Twisted Nematic), VA (Vertically Aligned), and HAN (Hybrid Aligned Nematic).

The polarizing element is generally constructed such that a transparent protective film made of triacetyl cellulose (herein referred to as TAC) is attached to the opposite sides of a polarizing film formed of an oriented polyvinyl alcohol (herein referred to as PVA) in which iodine is diffused.

As for the optical compensating layer, there have been proposed various kinds of layers. For example, in the case of a VA (Vertically Aligned) mode liquid crystal display device which is capable of performing a high-contrast display, there has been employed an optical retardation film exhibiting negative birefringence anisotropy, with the optical axis thereof being perpendicular to the substrate thereof (or negative C plate) together with an optical retardation film exhibiting positive birefringence anisotropy with the optical axis thereof being horizontal to the substrate thereof (or positive A plate) (for example, see JP-A 2000-136253 (KOKAI)).

In recent years, because of the thinness in wall thickness and the resultant advantages such as space-saving, light-weight properties, power-saving, etc., liquid crystal display devices are now rapidly propagated, especially as a display device for televisions, and, consequently, it is required to further enhance various display performance factors, such as the brightness, contrast and omnidirectional visibility.

More specifically, a liquid crystal display device such as an IPS or VA of a normally black mode which makes it possible to realize further enhanced contrast and a wider view field display is employed as especially preferable for use in televisions. With respect to the aforementioned optical compensating layer, many are designed to obtain an optimal value so as to make it possible to minimize the generation of coloring on the occasion of viewing a black color from the front of the television and to minimize the color shift on the occasion of viewing the television obliquely.

There is, however, a problem that, when the values of perpendicular optical retardation of red colored display pixels, green colored display pixels and blue colored display pixels constituting the color filter (hereinafter, referred to as Rth(R), Rth(G) and Rth(B), respectively) differ from each other, coloring is caused to generate on the occasion of viewing a black color obliquely.

Especially, when the values of perpendicular optical retardation of red colored display pixels, green colored display pixels and blue colored display pixels constituting the color filter are non-uniform, i.e. Rth(R)<Rth(G)>Rth(B) or Rth(R)>Rth(G)<Rth(B), it is no longer possible, for the optical compensating layer which is designed to exhibit unidirectional (continuous) wavelength dispersion to the wavelength of light, to compensate the non-uniform values of perpendicular optical retardation among these colors at such a high level in display quality that is demanded nowadays.

More specifically, even though it is possible to realize excellent visibility as the display face is observed from the front side thereof (the direction perpendicular to the display face), when the display face is observed obliquely at an angle of 45 degrees (hereinafter, referred to simply as oblique visibility), only the light of a specific color is caused to leak, resulting in coloring of black color to generate a reddish, bluish or greenish black color.

Since the magnitude of retardation of a color filter is relatively small as compared with that of other components to be employed in a liquid crystal display device, the aforementioned problem was not considered seriously up to date. However, in the case of the liquid crystal television where high contrast and wide viewing-angle properties are demanded, the aforementioned problem cannot be disregarded any longer.

Especially, in the case of the liquid crystal television where a high contrast of not less than 1000 or not less than 3000 is demanded, since the quality of the black color image is required to be excellent, the aforementioned problem cannot be disregarded any longer.

Since the optical designing is now generally performed centering around the green color, if the magnitude of retardation of green display pixels differs greatly from that of red and blue display pixels, light leakage is caused to generate, thus raising problems with respect to the oblique visibility of the display device. With a view to overcome this problem, there has been proposed to incorporate a macromolecule having a planar structure group on its side chain into a colored macromolecular membrane or to incorporate birefringence-reducing particles having a birefringence index which is opposite in sign (positive or negative) to the macromolecule into a colored macromolecular membrane, thereby trying to reduce the magnitude of retardation which the color filter has (for example, see JP-A 2000-136253 (KOKAI) and JP-A 2000-187114 (KOKAI)).

As a matter of fact however, it has been discovered as a result of studies made by the present inventors on this problem, that the value of perpendicular optical retardation of the color filter differs greatly according to the kind of pigment to be employed, the fineness and dispersed state of the pigment, or the kind of matrix resin (for example, acrylic resin or cardo resin). Therefore, it has been found impossible to expect sufficient effects even with the aforementioned methods of incorporating a macromolecule having a planar structure group on its side chain or birefringence-reducing particles into a colored macromolecular membrane, thus failing to solve the aforementioned problem.

Especially, in the case of a color filter wherein a transparent resin, represented by acrylic resin, which enables organic pigments to be readily dispersed therein, is used as a substrate for a high-contrast liquid crystal display device, it has been found difficult to improve the oblique visibility while securing a desired high-contrast value (not less than 1000, more preferably not less than 3000).

Additionally, according to the prior art, it was simplistically believed, erroneously, that an excellent color filter is one with a smaller birefringence, and even though many studies have been made on the means for improving the oblique visibility, no serious study has been made on the means for minimizing the difference in values of perpendicular optical retardation to such a level that does not raise any problem as a high-contrast liquid crystal display device to thereby regulate the perpendicular optical retardation of each color to an optimal value.

Meanwhile, it has been discovered by the present inventors that the retardation of the color filter layer of each of red, green and blue pixel patterns differs depending on the color, i.e. red is enabled to indicate positive or negative retardation, blue is enabled to indicate positive retardation and green is enabled to indicate negative retardation.

BRIEF SUMMARY OF THE INVENTION

A first object of the present invention is to provide, for the purpose of enhancing the oblique visibility in a high-contrast liquid crystal display device based on the aforementioned novel findings, a photosensitive coloring composition which makes it possible to suitably control the values of perpendicular optical retardation of the red, green and blue color pixels constituting a color filter.

A second object of the present invention is to provide, through a combination of an optical compensation layer with other constituent members based on the aforementioned novel findings, a liquid crystal display device which is capable of preventing the generation of undesirable coloring as the display face is observed not only from the axial direction (or normal direction) of the display face but also from the direction biased from the axial direction by an angle of 45 degrees, and also capable of securing excellent front visibility (normal direction to the display face); or to provide a color filter wherein the value of perpendicular optical retardation is suitably controlled so as to secure the aforementioned features.

A third object of the present invention is to provide a liquid crystal display device which is capable of preventing the generation of undesirable coloring even if the display face is observed obliquely, and is hence excellent in visibility, and which can be manufactured through a combination of the aforementioned color filters with an optical compensation layer and other constituent members.

According to a first aspect of the present invention, there is provided a coloring composition for a color filter, which comprises a transparent resin, an organic pigment dispersed in the transparent resin, and a retardation-regulating agent containing a compound which is capable of increasing a retardation.

According to a second aspect of the present invention, there is provided a color filter comprising a transparent substrate, and colored pixels of at least one color which is formed on the transparent substrate, wherein the colored pixels are formed using a coloring composition including a transparent resin, an organic pigment dispersed in the transparent resin, and a retardation-regulating agent containing a compound which is capable of increasing a retardation.

According to a third aspect of the present invention, there is provided a liquid crystal display device comprising: a first transparent substrate having a thin film transistor array and a first transparent electrode formed thereon; a second transparent substrate disposed to face the first transparent substrate and having a color filter and a second transparent electrode formed thereon; and a liquid crystal layer interposed between the first transparent substrate and the second transparent substrate; wherein the color filter is provided with colored pixels of at least one color which are formed on the second transparent substrate by using a coloring composition including a transparent resin, an organic pigment dispersed in the transparent resin, and a retardation-regulating agent containing a compound which is capable of increasing a retardation.

BRIEF DESCRIPTION OF THE SEVERAL
VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

Figure 2:
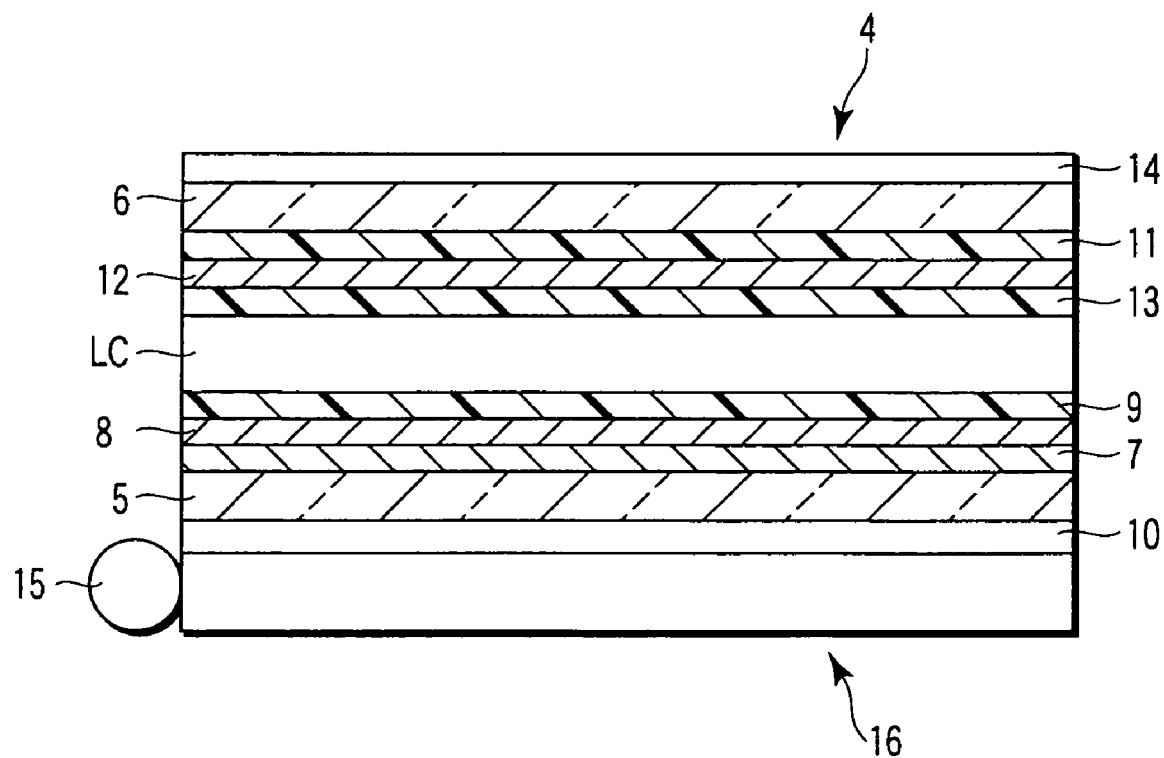

FIG. 1 is a cross-sectional view schematically illustrating the color filter according to one embodiment of the present invention; and FIG. 2 is a cross-sectional view schematically illustrating one example of a liquid crystal display device which is provided with a color filter of the present invention.

DETAILED DESCRIPTION OF THE INVENTION

Next, various embodiments of the present invention will be explained.

The value of perpendicular optical retardation of each of colored pixels of the color filter according to one embodiment of the present invention can be obtained by a method wherein a continuous light containing a wavelength of a peak region of visible transmissive light (for example, the wavelength of light ranging from 380 nm to 780 nm) is irradiated on a color filter which is provided with colored pixels of at least three colors including red 3 (R), green 3 (G) and blue 3 (B) from a location in front of the color filter and from a plurality of locations which are angled to the surface of the color filter, and the three-dimensional refractive index of the light emitted therefrom is measured by making use of a retardation-measuring apparatus such as an ellipsometer.

For example, a light having a wavelength of 610 nm in the case of a red colored pixel, 550 nm in the case of a green colored pixel, and 450 nm in the case of a blue colored pixel is irradiated to the color filter from a location in front of the color filter and from at least two other locations at an incident angle of 45 degrees to thereby perform the measurement of optical retardation to obtain three-dimensional refractive indexes of Nx, Ny and Nz. Thereafter, the values of perpendicular optical retardation (Rth) are calculated according to the following formula.

$$Rth=\{(Nx+Ny)/2-Nz\}\times d$$

Wherein Nx is a refractive index in the x-direction in plane of the colored pixel; Ny is a refractive index in the y-direction in plane of the colored pixel; Nz is a refractive index in the thickness wise-direction of the colored pixel; Nx being defined as a retarded phase axis represented by $Nx \geq Ny$; and d is a thickness (nm) of colored pixel.

In this case, if the object to be measured is a color filter, the value of optical retardation of a single-colored pixel can be determined by performing the measurement of optical retardation by irradiating light through a mask which is worked to permit the light to pass through only single-colored pixels of R, G or B.

For example, when a light having a wavelength of 610 nm is used as an incident light, it is possible to obtain a value of optical retardation which originates only from a red colored pixel; when a light having a wavelength of 550 nm is used as an incident light, it is possible to obtain a value of optical retardation which originates only from a green colored pixel; and when a light having a wavelength of 450 nm is used as an incident light, it is possible to obtain a value of optical retardation which originates only from a blue colored pixel, thus making it possible to estimate an approximate value of optical retardation of single-colored pixel of each color.

Incidentally, in the case where the object to be measured is a single-colored pixel of R, G or B (a coloring composition of a single color is coated on the surface of a transparent substrate), the measurement of optical retardation can be performed without necessitating any mask.

The coloring composition for a color filter for forming a color filter according to one embodiment of the present invention is formed of a coating liquid comprising a base material consisting of a monomer or a polymer such as acrylic resin and cardo resin, which is useful in easily securing a high contrast, at least one kind of material selected from an organic solvent, a photo-polymerization initiator and a curing agent, and an organic pigment dispersed in the base material.

The color filter according to one embodiment of the present invention can be obtained by a method in which the aforementioned coloring composition is used as a color resist and patterned by means of photolithography or by a method in which the aforementioned coloring composition is used as an ink and coated by means of an inkjet or printing.

As for the details of the components constituting the coloring composition to be employed for creating the color filter, they will be explained hereinafter.

The retardation-regulating agent to be employed in the color filter according to one embodiment of the present invention is an additive which is designed to regulate the perpendicular optical retardation of the color filter which is formed as a colored coated film on the surface of a transparent substrate, of a reflective substrate or of a semiconductor substrate by making use of the coloring composition for the color filter.

Especially, the retardation-regulating agent is designed to be incorporated in the coloring composition for a color filter of at least one kind of color for the purpose of improving the oblique visibility.

In order to secure a high contrast of not less than 1000 or not less than 3000, the compound to be used as the retardation-regulating agent is preferably selected from those which are excellent in dispersibility.

More specifically, although it is possible to employ particulate materials such as inorganic particles as a retardation-regulating agent, it is preferable to refrain from using them due to the optical scattering and depolarization thereof.

Further, when the colored pixels of plural colors are formed, as a color filter, on the surface of a transparent substrate, although it is possible to incorporate the retardation-regulating agent into all of the colored pixels of plural colors, the addition of a retardation-regulating agent may be limited to only the colored pixels of one or two colors.

As for the retardation-regulating agent to be employed in the color filter according to one embodiment of the present invention, it is possible to employ organic compounds which are capable of regulating the retardation so as to increase it.

More specifically, it is possible to employ an organic compound having one or more planar structure groups having a cross-linking group. For example, it is possible to employ, as such an organic compound, at least one kind of compound selected from the group consisting of melamine compounds, porphyrin compounds, epoxy compounds and polymeric liquid crystal compounds.

It is generally considered that it is possible to remove the perpendicular optical retardation of the film as a whole by simply adding, to the coloring composition, particles having a planar structure group and exhibiting a birefringence index which is opposite in sign (positive or negative) to the pigment, or other kinds of resin.

However, when particles having a planar structure group are simply added to the coloring composition, the particles themselves are caused to orientate at random, thereby reducing the effects thereof to remove the perpendicular optical retardation of the film as a whole.

Under the circumstances, it has been discovered, as a result of profound studies made by the present inventors, that when the organic compound is provided with a planar structure having at least one cross-linking group, the perpendicular optical retardation of the film as a whole can be greatly changed, thus enabling the organic compound to exhibit sufficient effects.

For example, when the retardation-regulating agent is provided with a functional group which is capable of cross-linking during the photo-curing process or thermosetting process in the step of photolithography, the planar structure group is prevented from rotating freely and is more inclined to orientate in one direction, as a whole, on the occasion of shrinking in the step of thermal setting and then fixed thereto, thus enabling the retardation-regulating agent to effectively exhibit the function thereof to control the optical retardation.

As for specific examples of the planar structure, they include a group having at least one aromatic ring. For example, in the case of monocyclic hydrocarbon, it is possible to employ a phenyl group, cumenyl group, mesityl group, tolyl group, xylyl group, benzyl group, phenethyl group, styryl group, cinnamyl group, trityl group, etc. In the case of polycyclic hydrocarbon, it is possible to employ a pentalenyl group, indenyl group, naphthyl group, viphenylene group, acenaphthylene group, fluorene group, phenanthryl group, anthracene group, triphenylene group, pyrene group, naphthacene group, pentaphene group, pentacene group, tetraphenylene group, trinaphthylene group, etc. In the case of a heteromonocyclic compound, it is possible to employ pyrrolyl group, imidazolyl group, pyrazolyl group, pyridyl group, pyrazinyl group, triazine group, etc. In the case of a heteropolycyclic compound, it is possible to employ indolydinyl group, isoindolyl group, indolyl group, purinyl group, quinolyl group, isoquinolyl group, phthalazinyl group, naphthylydinyl group, quinoxalynyl group, cinolynyl group, carbazolyl group, carbolynyl group, acrydinyl group, porphyrin group, etc. These groups may contain a substituent group such as a hydrocarbon group, halogen, etc.

As for the at least one cross-linking group to be attached to the planar structure group, unsaturated polymeric groups (A, B, C, D, E, F) or functional groups (I, J, K, L, M, N, O) or thermally polymerizable groups (G, H, P, Q, R, S, T, U) can be preferably employed. Among them, epoxy groups (G, H) are more preferable and groups of P—U are most preferable for use.

Further, as for the unsaturated polymeric group, it is more preferable to employ ethylenic unsaturated polymeric groups (A, B, C, D). Alternatively, groups such as —CH$_2$NHCOCH=CH$_2$, —CH$_2$NHCO(CH$_2$)$_7$=CH(CH$_2$)$_7$CH$_3$, and —OCO(C$_6$H$_4$)O(CH$_2$)$_6$CH=CH$_2$ can be also suitably employed.

When at least one reactive functional group such as a hydroxyl group is included in the planar structure group, these cross-linking groups can be easily obtained through the reaction between the aforementioned reactive functional group and a compound having a functional group which is capable of reacting with the aforementioned reactive functional group and also having an ethylenic unsaturated group such as glycidyl(metha)acrylate, 2-(metha)acryloyloxyisocyanate, tolylene-2,4-diisocyanate, etc.

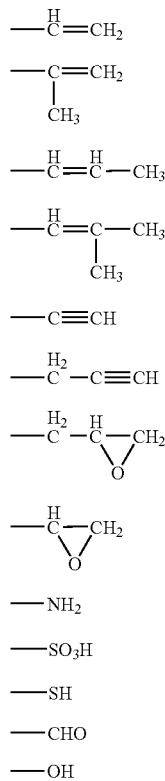

—N=C=O (N)

—N=C=S (O)

—NH— (P)

—N(CH$_2$OC) (Q)

—N(CH$_2$OCH$_3$)(CH$_2$OH) (R)

—N(CH$_2$OH)$_2$ (S)

—NHCH$_2$OCH$_3$ (T)

—NHCH$_2$OH (U)

As for the melamine compound, compounds represented by the following general formula (1) and available in the market can be preferably employed. Alternatively, any kind of compound having any of the aforementioned planar structure groups can be also employed. Following are examples of melamine compounds.

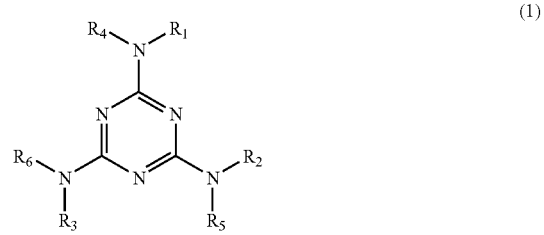

Wherein R$_1$, R$_2$ and R$_3$ are individually a hydrogen atom, methylol group, alkoxymethyl group or alkoxy n-butyl group; and R$_4$, R$_5$ and R$_6$ are individually a methylol group, alkoxymethyl group or alkoxy n-butyl group. It is possible to employ a copolymer having a combination of two or more kinds of repeated units. Two or more kinds of homopolymers or copolymers may be co-used.

In addition to the compounds described above, it is also possible to employ a compound having 1,3,5-triazine ring such as those set forth in JP-A 2001-166144 (KOKAI). Further, the compounds represented by the following general formula (2) can be also preferably employed.

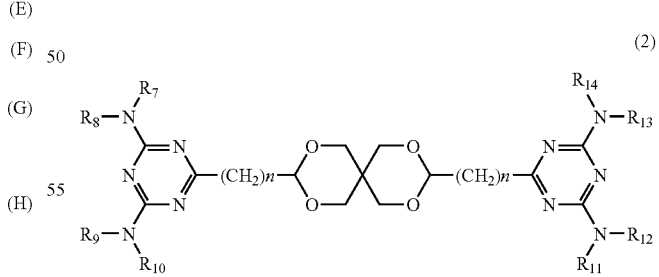

Wherein R$_7$ through R$_{14}$ are individually a hydrogen atom, alkyl group, aryl group or heterocyclic group. Among them, the hydrogen atom is especially preferable.

Further, compounds having a porphyrin skeleton and represented by the following general formula (3) can be preferably employed. In this general formula (3), n is an integer of 1-20, an integer of 2 being more preferable.

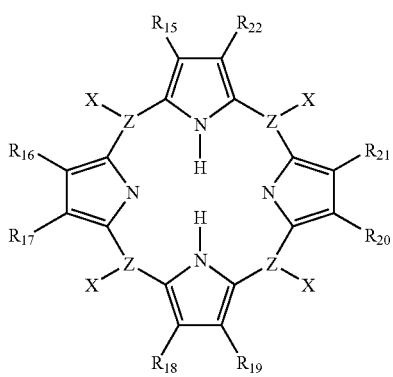

(3)

Wherein $R_{15}$ through $R_{22}$ are individually a hydrogen atom, halogen atom, alkoxy group, alkylthio group, substituted or unsubstituted phenoxy group, substituted or unsubstituted naphthoxy group, substituted or unsubstituted phenylthio group, or substituted or unsubstituted naphthylthio group.

Following are specific examples of porphyrin compound represented by the general formula (3). As for the halogen atom in $R_{15}$ through $R_{22}$, it is possible to employ fluorine, chlorine, bromine and iodine atoms. Further, as for the alkoxy group and thioalkyl group, although there is not any particular limitation, it is preferable to employ those whose alkyl group in the substituent group is formed of a linear, branched or cyclic alkyl group having 1-12 carbon atoms. Among them, it is most preferable to employ a linear, branched or cyclic alkyl group having 1-8 carbon atoms.

X represents hydrogen atom, halogen atom, alkoxy group, substituted or unsubstituted phenyl group, and substituted or unsubstituted phenoxy group. As for specific examples of the halogen atom, they include fluorine, chlorine, bromine and iodine atoms. As for specific examples of the alkoxy group, they include a linear, branched or cyclic alkyl group having 1-12 carbon atoms. Among them, it is most preferable to employ a linear, branched or cyclic alkyl group having 1-8 carbon atoms. As for specific examples of the substituted or unsubstituted phenyl group, they include a phenyl group, p-chlolophenyl group, p-bromophenyl group, and p-nitrophenyl group. As for specific examples of the substituted or unsubstituted phenoxy group, they include a phenoxy group, p-chlolophenoxy group, p-bromophenoxy group, and p-nitrophenoxy group. Z represents —$CH_2$— or —N—.

As for specific examples of alkyl group in the alkoxy group and thioalkyl group, they include methyl, ethyl, n-propyl, iso-propyl, n-butyl, iso-butyl, sec-butyl, t-butyl, n-pentyl, iso-pentyl, 2-methylbutyl, 1-methylbutyl, neo-pentyl, 1,2-dimethylpropyl, 1,1-dimethylpropyl, cyclopentyl, n-hexyl, 4-methylpentyl, 3-methylpentyl, 2-methylpentyl, 1-methylpentyl, 3,3-dimethylbutyl, 2,3-dimethylbutyl, 1,3-dimethylbutyl, 2,2-dimethylbutyl, 1,2-dimethylbutyl, 1,1-dimethylbutyl, 3-ethylbutyl, 2-ethylbutyl, 1-ethylbutyl, 1,1,2-trimethylbutyl, 1,2,2-trimethylbutyl, 1-ethyl-2-methylpropyl, cyclohexyl, n-heptyl, 2-methylhexyl, 3-methylhexyl, 4-methylhexyl, 5-methylhexyl, 2,4-dimethylpentyl, n-octyl, 2-ethylhexyl, 2.5-dimethylhexyl, 2,5,5-trimethylpentyl, 2,4-dimethylhexyl, 2,2,4-trimethylpentyl, n-octyl, 3,5,5-trimethylhexyl, n-nonyl, n-decyl, 4-ethyloctyl, 4-ethyl-4,5-dimethylhexyl, n-undecyl, n-dodecyl, 1,3,5,7-tetraethyloctyl, 4-butyloctyl, 6,6-diethyloctyl, n-tridecyl, 6-methyl-4-butyloctyl, n-tetradecyl, n-pentadecyl, 3,5-dimethylheptyl, 2,6-dimethylheptyl, 2,4-dimethylheptyl, 2,2,5,5-tetramethylhexyl, 1-cyclopentyl-2,2-dimethylpropyl, 1-cyclohexyl-2,2-dimethylpropyl, etc.

As for specific examples of the substituted or unsubstituted phenoxy group, they include phenoxy, 2-methylphenoxy, 3-methylphenoxy, 4-methylphenoxy, 2-ethylphenoxy, 3-ethylphenoxy, 4-ethylphenoxy, 2,4-dimethylphenoxy, 3,4-dimethylphenoxy, 4-t-butylphenoxy, 4-aminophenoxy, 4-dimethylaminophenoxy, 4-diethylaminophenoxy, etc.

As for specific examples of the substituted or unsubstituted naphthoxy group, they include 1-naphthoxy, 2-naphthoxy, nitronaphthoxy, cyanonaphthoxy, hydroxynaphthoxy, methylnaphthoxy, trifluoromethylnaphthoxy, etc.

As for specific examples of the substituted or unsubstituted phenylthio group, they include phenylthio, 2-methylphenylthio, 3-methylphenylthio, 4-methylphenylthio, 2-ethylphenylthio, 3-ethylphenylthio, 4-ethylphenylthio, 2,4-dimethylphenylthio, 3,4-dimethylphenylthio, 4-t-butylphenylthio, 4-aminophenylthio, 4-dimethylaminophenylthio, 4-diethylaminophenylthio, etc.

As for specific examples of the substituted or unsubstituted naphthylthio group, they include 1-naphthylthio, 2-naphthylthio, nitronaphthylthio, cyanonaphthylthio, hydroxynaphthylthio, methylnaphthylthio, trifluoromethylnaphthylthio, etc.

As for specific examples of the epoxy compound having a planar structure group, they include bisphenol type epoxy compounds such as, for example, bisphenol A epoxy compound, bisphenol F epoxy compound, bisphenol AD epoxy compound, hydrogenated bisphenol A epoxy compound, etc.; novolac type epoxy compounds such as, for example, phenolnovolac epoxy compound, cresolnovolac epoxy compound, etc.; glycidylamine type epoxy compounds such as, for example, tetraglycidyldiaminodiphenylmethane, triglycidyl-p-aminophenol, triglycidyl-m-aminophenol, tetraglycidyl-m-xylene diamine, etc.; glycidylester type epoxy compounds such as, for example, diglycidylphthalate, diglycidylhexahydrophthalate, diglycidyltetrahydrophthalate, etc.; and heterocyclic epoxy compounds such as, for example, triglycidylisocyanurate, etc.

The following chemical formula (4) shows one example thereof.

(4)

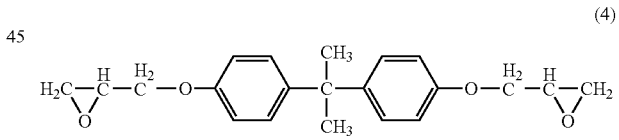

As for the polymeric liquid crystal compound, although it is possible to employ a bar-like liquid crystal molecule and a discotheque liquid crystal molecule, it is especially preferable to employ the discotheque liquid crystal molecule. As for the bar-like liquid crystal molecule, it is possible to employ the liquid crystal molecules described in JP-A 2006-16599 (KOKAI). It is also possible to employ other kinds of bar-like liquid crystal molecules, examples of which including azomethine compounds, azoxy compounds, cyanobiphenyls, cyanophenyl esters, benzoic esters, phenylcyclohexane carboxylates, cyanophenylcyclohexanes, cyano-substituted phenyl pyrimidine, alkoxy-substituted phenyl pyrimidine, phenyldioxanes, tolanes, alkenylcyclohexyl benzonitriles, etc. As for the discotheque liquid crystal molecule, the molecules described in JP-A 8-27284 (KOKAI) can be employed. Following are examples of the discotheque liquid crystal molecule.

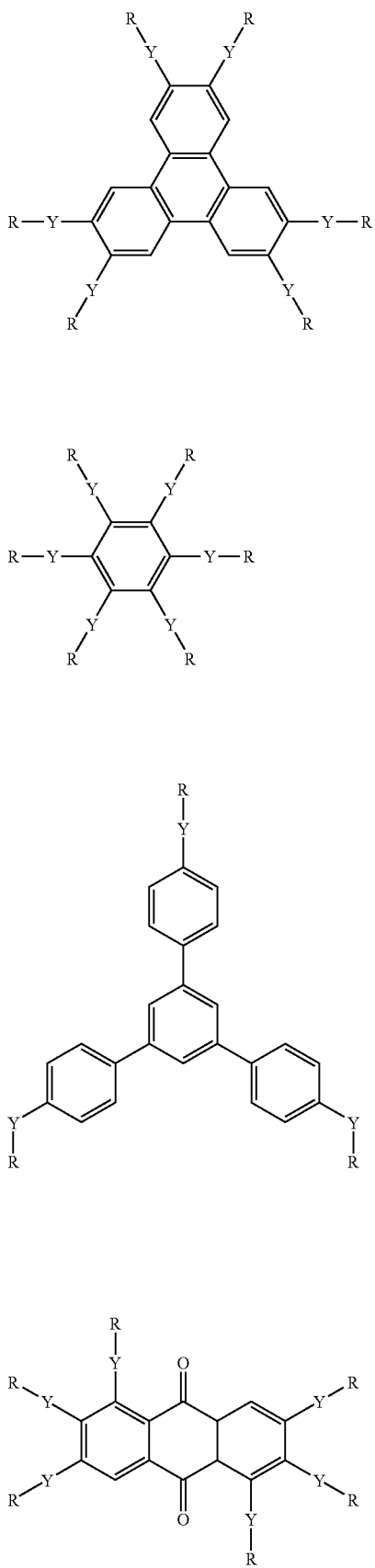

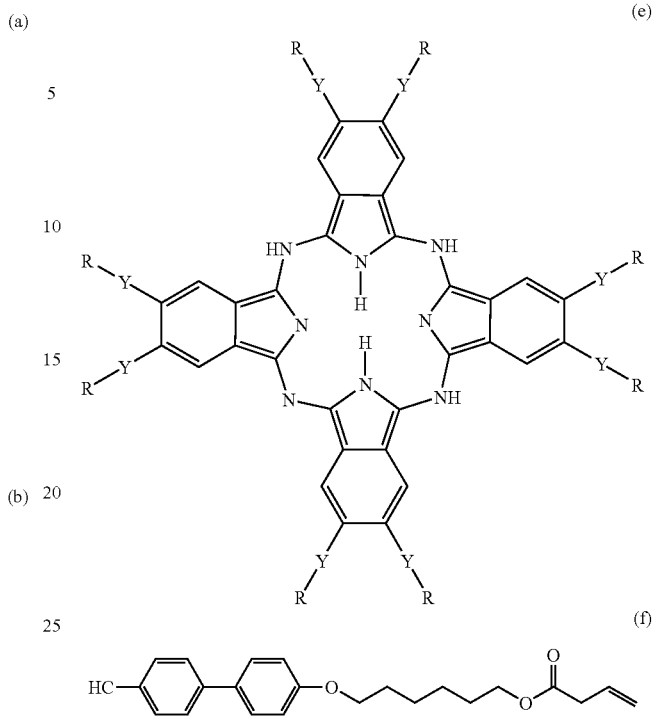

In the aforementioned chemical formulas, Y is a bivalent linking group selected from the group consisting of an alkylene group, alkenylene group, arylene group, —CO—, —NH—, —O—, —S— and a combination of any of these groups. It is most preferable to employ a group consisting of a combination of at least two kinds of these bivalent linking groups.

As for the number of carbon atoms in the alkylene group, it should preferably be limited to the range of 1-12. As for the number of carbon atoms in the alkenylene group, it should preferably be limited to the range of 2-12. As for the number of carbon atoms in the arylene group, it should preferably be limited to the range of 6-10.

An alkylene group, alkenylene group, or arylene group may contain a substituent group (for example, an alkyl group, halogen atoms, cyano group, alkoxy group, acyloxy group).

R represents at least one kind of cross-linking group selected from unsaturated polymeric groups (A, B, C, D, E, F) or functional groups (I, J, K, L, M, N, O) or thermally polymerizable groups (G, H, P, Q, R, S, T, U), an alkyl group which is substituted by any of these cross-linking groups, an alkenyl group which is substituted by any of these cross-linking groups, aryl group which is substituted by any of these cross-linking groups, or a heterocyclic group which is substituted by any of these cross-linking groups. It is also possible to suitably employ groups such as —CH$_2$NHCOCH=CH$_2$, —CH$_2$NHCO(CH$_2$)$_7$=CH(CH$_2$)$_7$CH$_3$, and —OCO(C$_6$H$_4$)O(CH$_2$)$_6$CH=CH$_2$.

Next, there will be explained the color filter according to one embodiment of the present invention.

As shown in FIG. 1, the color filter according to one embodiment of the present invention comprises a glass substrate 1, on which a black matrix 2 acting as a light-shielding layer, and colored pixels consisting of at least three kinds of color, i.e. a red colored pixel 3 (R), a green colored pixel 3 (G) and a blue colored pixel 3 (B), are disposed.

Incidentally, in addition to these three kinds of color, a complementary color may be combined therewith. Alternatively, it is also possible to employ a color filter of multiple colors, comprising not less than three colors including a complementary color and any additional color.

Generally, the absolute value of the birefringence index of a color filter should be confined to not larger than 0.01. In other words, the perpendicular optical retardation (Rth) should desirably be as close to Rth(R)=Rth(G)=Rth(B)=0 as possible.

However, it has been discovered, as a result of profound studies made by the present inventors, that when the birefringence index of a color filter is considered in combination with other constituent members, such as the wavelength dispersibility of optical retardation, the optimal value of perpendicular optical retardation for a color filter exists under certain conditions other than the situation where Rth(R)=Rth(G)=Rth(B)=0.

The determination of which value is most desirable for the optical retardation Rth of each of colored pixels in the color filter may differ depending on the combination thereof with other constituent members. What is important is the fact that "in the situation where the Rth of blue pixel is smaller than that of green pixel, even though the Rth of green pixel is larger than that of red pixel", or "in the situation where the Rth of blue pixel is larger than that of green pixel, even though the Rth of green pixel is smaller than that of red pixel", it is impossible to realize excellent oblique visibility.

The reason for this can be attributed to the fact that, in the case of constituent members represented by an optical retardation plate to be employed in a liquid crystal display device, the wavelength dispersibility of birefringence varies unidirectionally (continuously) relative to the wavelength of transmitting light. Therefore, it is necessary to select a combination which enables to obtain optimum oblique visibility from the combinations of optical members of the liquid crystal display device, such as the liquid crystal, the polarizing plate, the optical retardation plate and the alignment film.

For the manufacture of the red colored pixel, it is possible to employ red pigments such as C.I. Pigment Red 7, 14, 41, 48:2, 48:3, 48:4, 81:1, 81:2, 81:3, 81:4, 146, 168, 177, 178, 184, 185, 187, 200, 202, 208, 210, 246, 254, 255, 264, 270, 272, 279, etc. Incidentally, this red color pigment may be employed together with a yellow pigment or an orange pigment.

As for yellow pigments, it is possible to employ C.I. Pigment Yellow 1, 2, 3, 4, 5, 6, 10, 12, 14, 15, 16, 17, 18, 24, 31, 32, 34, 35, 35:1, 36, 36:1, 37, 37:1, 40, 42, 43, 53, 55, 60, 61, 62, 63, 65, 73, 74, 77, 81, 83, 93, 94, 95, 97, 98, 100, 101, 104, 106, 108, 109, 110, 113, 114, 115, 116, 117, 118, 119, 120, 123, 125, 126, 127, 128, 129, 147, 151, 152, 153, 154, 155, 156, 161, 162, 164, 166, 167, 168, 169, 170, 171, 172, 173, 174, 175, 176, 177, 179, 180, 181, 182, 187, 188, 193, 194, 199, 213, 214, etc.

As for orange pigments, it is possible to employ C.I. Pigment Orange 36, 43, 51, 55, 59, 61, 71, 73, etc.

When the red color display pixel contains at least one kind of pigment selected from diketopyrrolopyrrol-based red pigment and anthraquinone-based red pigment out of the aforementioned pigments, it would become easy to obtain a desired value for the $R_{Rth}$ and hence the employment of these red pigments is preferable.

This is because, regarding the pulverizing treatment of diketopyrrolopyrrol-based red pigment, the Rth thereof can be made positive or negative as desired and the absolute value thereof can be controlled more or less, while in the case of the anthraquinone-based red pigment, a value of Rth which is close to 0 can be easily obtained irrespective of the pulverizing treatment thereof.

As regards the hue, lightness, film thickness and pixel contrast, the composition of a red colored pixel should preferably be formed of 10-90% by weight of diketopyrrolopyrrol-based red pigment and 50-70% by weight of the anthraquinone-based red pigment both based on a total weight of the pigments. When the pixel contrast is taken into account, the composition of a red colored display pixel should preferably be formed of 25-75% by weight of diketopyrrolopyrrol-based red pigment and 30-60% by weight of the anthraquinone-based red pigment, both based on a total weight of the pigments.

For the purpose of regulating the hue of a red colored pixel, the red pixel may contain a yellow pigment or orange pigment. However, in viewpoint of enhancing the contrast, it is more preferable to employ azo-metal complex type yellow pigments.

As for the mixing ratio of the azo-metal complex type yellow pigments, it is preferable to confine it to the range of 5-25% by weight based on a total weight of the pigments. If the mixing ratio of the azo-metal complex type yellow pigments is less than 5% by weight, it would become impossible to regulate the pixel hue, thus failing to obtain sufficiently increased lightness. If the mixing ratio of the azo-metal complex type yellow pigments is larger than 30% by weight, the pixel hue may be excessively shifted to a yellowish color, thus deteriorating the color reproducibility.

As for the diketopyrrolopyrrol-based red pigment, it is preferable to employ C.I. Pigment Red 254, for the anthraquinone-based red pigment, it is preferable to employ C.I. Pigment Red 177, and for the azo-metal complex type yellow pigments, it is preferable to employ C.I. Pigment Yellow 150, in order to secure excellent light resistance, heat resistance, transparency and tinting strength.

As for the green colored pixel, it is possible to employ green pigments such as C.I. Pigment Green 7, 10, 36, 37, 58 etc. This green color composition may be employed together with a yellow pigment. As for the yellow pigment, it is possible to employ the same kinds of yellow pigments as employed in the aforementioned red colored pixel.

From the viewpoints of the hue, pixel lightness and film thickness, the composition of a green colored pixel should preferably be formed of 30-90% by weight of a metallophthalocyanine halide-based green pigment, 5-60% by weight of an azo-based yellow pigment and 5-60% by weight of the quinophthalone-based yellow pigment, all based on a total weight of the pigments. It is more preferable to confine the content of metallophthalocyanine halide-based green pigment to 50-85% by weight, the content of azo-based yellow pigment to 5-45% by weight, and the content of quinophthalone-based yellow pigment to 5-45% by weight, all based on a total weight of the pigments.

As for the metallophthalocyanine halide-based green pigment, it is preferable to employ C.I. Pigment Green 7, 36, for the azo-based yellow pigment, it is preferable to employ C.I. Pigment Yellow 150, and for the quinophthalone-based yellow pigment, it is preferable to employ C.I. Pigment Yellow 138, in order to secure excellent light resistance, heat resistance, transparency and tinting strength.

As for the blue colored pixel, it is possible to employ blue pigments such as C.I. Pigment Blue 15, 15:1, 15:2, 15:3, 15:4, 15:6, 16, 22, 60, 64, etc. Further, these blue pigments may be used together with a violet pigment, specific examples of the violet pigment including C.I. Pigment Violet 1, 19, 23, 27, 29, 30, 32, 37, 40, 42, 50, etc.

When the blue colored display pixel contains at least one kind of pigment selected from a metallophthalocyanine-based blue pigment and dioxazine-based violet pigment out of the aforementioned pigments, it is possible to easily obtain a value of Rth which is close to 0.

From the viewpoints of the hue, pixel lightness and pixel film thickness, the composition of a blue colored pixel should preferably be composed of 40-100% by weight of a metallophthalocyanine-based blue pigment and 1-50% by weight of the dioxazine-based violet pigment all based on a total weight of the pigments. More preferably, the blue colored pixel should contain 50-98% by weight of metallophthalocyanine-based blue pigment and 2-25% by weight of the dioxazine-based violet pigment based on a total weight of the pigments.

From the viewpoints of the light resistance, heat resistance, transparence and tinting strength of the pixel, it is preferable to employ C.I. Pigment Blue 15:6 as the metallophthalocyanine-based blue pigment and C.I. Pigment Violet 23 as the dioxazine-based violet pigment.

As for the inorganic pigment, it is possible to employ a metal oxide powder, metal sulfide powder, metal powder such as yellow lead, zinc chrome, red iron oxide (III), cadmium red, ultramarine blue, Prussian blue, chromium oxide green, cobalt green, etc.

Further, in order to secure excellent coating properties, sensitivity, developing properties while making it possible to retain a balance between the chroma and lightness, these inorganic pigments may be used in combination with organic pigments. For the purpose of toning, each of the color display pixels may further contain dyes within the limits which do not deteriorate the heat resistance of the pixels.

In order to realize enhanced brightness and enhanced contrast of the color filter, the pigments to be contained in each of the colored pixels should preferably be selected from those which have undergone a pulverization treatment or those whose average primary particle diameter d50 is relatively small.

The primary particle diameter d50 of pigment can be determined using a standard method which includes calculating by taking the picture of the pigment by making use of a transmission electron microscope and directly measuring a size of the primary particles by the image analysis of the picture. More concretely, the primary particle diameter is determined by measuring the major axis and minor axis of the primary particles of each pigment, and averaging these values. The primary particle diameter d50 herein represents a particle diameter (a diameter of equivalent circle) which corresponds to a particle diameter as measured where an integrated quantity in the cumulative curve of number particle size distribution is 50% of the total quantity. Even if either a transmission electron microscope (TEM) or scanning electron microscope (SEM) is employed, the same results are obtained.

The average primary particle diameter d50 of the pigment should preferably be confined to not larger than 40 nm, more preferably not larger than 30 nm, most preferably not larger than 20 nm. Further, the average primary particle diameter d50 of the pigment should preferably be not smaller than 5 nm. If the average primary particle diameter d50 of the pigment is larger than 40 nm, the visibility of a liquid crystal display device on the occasion of displaying black would be deteriorated. On the other hand, if the primary particle diameter d50 of the pigment is smaller than 5 nm, it may become difficult to realize satisfactory pigment dispersion, thereby making it difficult to maintain the stability of the color composition and to secure the fluidity of the color composition.

As a result, the luminance and color characteristics of the color filter may be deteriorated. Especially, the axial or front visibility would be badly affected by the employment of organic pigments having an average particle diameter d50 of larger than 40 nm.

The contrast C (C=Lp/Lc) can be calculated by a method wherein each of the colored pixels formed on a transparent substrate is sandwiched between a pair of polarizing plates with a backlight applied to one of the polarizing plates and emitted from the other of the polarizing plates, and then measuring the luminance of light emitted using a luminance meter. This enables measurement of the luminance of light under a condition in which these polarizing plates are disposed parallel with each other to determine the luminance of light (Lp), and also measurement of the luminance of light under a condition in which these polarizing plates are disposed intersected orthogonally with each other to determine the luminance of light (Lc). Using the above measurements, the ratio between (Lp) and (Lc) is calculated to determine the contrast C (C=Lp/Lc). When the contrast that can be obtained using simply a substrate having no colored pixel is defined as CS, the ratio between C and CS should preferably be: C/CS>0.45.

By minimizing the retardation of all the colors and by regulating this C/CS to C/CS>0.45, it is possible to minimize the coloring of a black color and hence to perform well-balanced black color.

Especially, when the contrast of a red colored pixel is represented by CR, the contrast of a green colored pixel is represented by CG, and the contrast of a blue colored pixel is represented by CB, as long as CR, CG and CB satisfy the conditions of CR/CS>0.45, CG/CS>0.45 and CB/CS>0.45, it is possible to obtain excellent front visibility on the occasion of displaying a black image on the liquid crystal display device, as indicated in the following Table 6. Namely, it is possible to reproduce a crisp black color without accompanying light leakage.

On the other hand, when the conditions of CR/CS>0.45, CG/CS>0.45 and CB/CS>0.45 are not completely satisfied, i.e., CR/CS≦0.45, CG/CS≦0.45 or CB/CS≦0.45, the light leakage would become prominent on the occasion of displaying a black image, thus failing to obtain a liquid crystal display device which is excellent in front visibility.

When the difference in retardation among all the colors is further minimized, it is possible to obtain a liquid crystal device which is excellent in both oblique visibility and front visibility. Incidentally, even if the conditions of CR/CS>0.45, CG/CS>0.45 and CB/CS>0.45 are entirely satisfied, if the difference in retardation among all the colors is large, the oblique visibility may become insufficient. This is the case of Comparative Example 6 where a retardation-enhancing agent is not incorporated into the green pixel, as shown in the following Table 8.

As for the means for controlling the average primary particle diameter of pigment and also controlling the perpendicular optical retardation, it is possible to employ a method wherein a pigment is mechanically pulverized, thereby controlling the diameter and shape of the primary particle (so-called attrition method); a method wherein a solution of pigment dissolved in a good solvent is introduced into a poor solvent, thereby precipitating a pigment having a desired primary particle diameter and a desired particle shape (so-called precipitation method); and a method wherein pigment having a desired primary particle diameter and a desired particle shape is manufactured on the occasion of synthesizing the pigment (so-called synthetic precipitation method). Depending on the synthesizing method and chemical characteristics of the pigment to be employed, any suitable method may be optionally selected for each pigment.

Following are explanations about the aforementioned methods. As for the specific method for controlling the primary particle diameter and particle shape of a pigment to be incorporated into the colored pixels constituting the color filter of the present invention, any of the aforementioned methods may be suitably selected.

The attrition method is a method wherein a pigment is mechanically kneaded together with a grinding agent, such as a water-soluble inorganic salt such as salt, and with a water-soluble organic solvent which does not dissolve the grinding agent, by making use of a ball mill, a sand mill or a kneader (hereinafter referred to as salt milling), after which the inorganic salt and the organic solvent are removed through water washing and dried to obtain a pigment having a desired particle diameter and a desired particle configuration. However, since there is the possibility that crystal growth is caused to occur in the pigment due to the salt milling treatment, it would be effective to incorporate a solid resin which can be partially dissolved by the aforementioned organic solvent and a pigment-dispersing agent on the occasion of the salt milling treatment to thereby prevent crystal growth.

With respect to the mixing ratio of the pigment and the inorganic salt, when the ratio of the inorganic salt becomes large, the refining efficiency of the pigment can be enhanced but the throughput of the pigment is caused to decrease, thereby deteriorating the productivity.

Because of this, it is generally preferable to confine the mixing ratio of the inorganic salt to 1-30 parts by weight, more preferably 2-20 parts by weight per one part by weight of the pigment. On the other hand, the water-soluble organic solvent is employed herein so as to make the pigment and the inorganic salt into a uniform agglomerate, so that the water-soluble organic solvent can be employed at a mixing ratio of 0.5-30 parts by weight per one part by weight of the pigment, though it may depend on the mixing ratio between the pigment and the inorganic salt.

More specifically, the attrition method is performed as follows. Namely, a small amount of a water-soluble organic solvent is added as a wetting agent to a mixture comprising a pigment and a water-soluble inorganic salt and then vigorously kneaded by making use of a kneader, etc. The resultant mixture is then introduced into water and stirred by making use of a high-speed mixer to obtain a slurry. This slurry is then subjected to filtration, water washing and drying to obtain a granular pigment having a desired primary particle diameter and configuration.

The precipitating method is a method wherein a pigment is dissolved in a suitable kind of solvent and then mixed with a poor solvent, thereby precipitating pigments having a desired primary particle diameter and a desired particle configuration. According to this precipitating method, it is possible to control the size of the primary particle diameter and the particle configuration by suitably selecting the kind and quantity of these solvents, the precipitation temperature, the precipitating rate, etc.

Since a pigment cannot be easily dissolved in a solvent in general, the solvents that can be employed are limited. Specific examples of the solvents that can be employed are strongly acidic solvents such as concentrated sulfuric acid, polyphosphoric acid, chlorosulfonic acid; and basic solvents such as liquid ammonia, dimethyl formamide solution of sodium methylate, etc.

As a typical example of this precipitating method, there is known an acid pasting method wherein a pigment is dissolved in an acidic solvent to obtain a solution, which is then introduced into another solvent to thereby re-precipitate fine particles, thus obtaining a pigment having desired features. In this case, in viewpoint of manufacturing cost, a method of pouring a sulfuric acid solution into water is generally employed in the industry.

Although there are no particular limitations with respect to the concentration of the sulfuric acid, it is generally preferable to confine it to the range of 95 to 100% by weight. Although there are no particular limitations with respect to the mixing ratio of the sulfuric acid and the pigment, if the mixing ratio is too small, the viscosity of the resultant solution would become too high, thus making it difficult to easily handle the solution. On the contrary, if the mixing ratio is too large, the treatment efficiency of the pigment would be deteriorated. Therefore, the mixing ratio of sulfuric acid to the pigment should preferably be confined to the range of 3-10 times (weight) the weight of the pigment.

Incidentally, the pigment is not necessarily required to be completely dissolved in the solvent. The temperature on the occasion of dissolution should preferably be confined to the range of 0-50° C. If the temperature is lower than 0° C., the sulfuric acid may freeze and, additionally, the solubility of the pigment will be decreased. On the other hand, if the temperature is higher than 50° C., a side reaction is more likely to occur.

The temperature of the water to be poured should preferably be confined to the range of 1-60° C. If the temperature of the water is higher than 60° C., the water may boil due to the heat of dissolution on the occasion of pouring water into the sulfuric acid, thus making the work very dangerous. On the other hand, if the temperature of the water is lower than 1° C., the water may freeze. The time for the pouring of water should preferably be confined to 0.1 to 30 minutes based on one weight part of the pigment. If the pouring time is prolonged, the primary particle diameter tends to become larger.

The control of the primary particle diameter and the particle configuration of the pigment may be performed by a combination of methods consisting of the precipitating method such as the acid pasting method and the attrition method, such as the salt milling method. This combination method is more preferable in the respects that it can be performed while taking the degree of grinding into consideration and that the fluidity of the dispersed body can be suitably secured.

In order to prevent flocculation of the pigment in the course of controlling the primary particle diameter and the particle configuration of the pigment during the salt milling or the acid pasting, a dispersing agent such as a pigment derivative, a resin type pigment dispersing agent, or a surfactant as shown below can be additionally employed. Further, when the control of the primary particle diameter and the particle configuration of pigment is performed in the presence of two or more kinds of pigments, it would become possible to obtain a stable dispersed body of pigments even if the pigments are inherently difficult to disperse if they are treated individually.

As a specific type of precipitation method, the leuco method is known, in which, when a vat dye type pigment such as a flavanthrone pigment, perinone pigment, perylene pigment, indanthrone pigment, etc. is reduced by making use of alkaline hydrosulfite, the quinine group thereof is turned into a sodium salt of hydroquinone (leuco compound), thus making it water-soluble. When a suitable oxidizing agent is added to this aqueous solution to oxidize the pigment, a pigment which is insoluble in water and small in primary particle diameter can be precipitated.

The synthesizing precipitation method is a method for precipitating a pigment having a desired primary particle diameter and a desired particle configuration concurrent with the synthesis of the pigment. Since filtration, which is a typical separation method, is difficult to perform unless pigment particles are flocculated into large secondary particles on the occasion of taking up the refined pigment products from a solvent, this synthesizing precipitation method is generally applied to a pigment such as azo type pigments, which can be synthesized in an aqueous system where secondary flocculation can easily take place.

Further, as for the means for controlling the primary particle diameter and the particle configuration of the pigments, it is also possible to employ a method wherein a pigment is dispersed for a long period of time by making use of a high-speed sand mill (so-called dry milling method for dry-milling a pigment), thereby making it possible to minimize the primary particle diameter of the pigment concurrently with the dispersion of the pigment.

Following is an explanation with respect to the coloring composition to be employed for forming each of the colored pixels of a color filter according to one embodiment of the present invention.

The pigment carrier to be contained in the color composition to be employed for forming the color display pixels of a color filter is employed for dispersing the pigment, and is formed of a transparent resin, precursors thereof or a mixture thereof.

The transparent resin to be employed herein should preferably have a permeability of not less than 80%, more preferably not less than 95% in a total wavelength range of 400-700 nm of visible light.

As for specific examples of the transparent resin, it is possible to employ a thermoplastic resin, thermosetting resin and photosensitive resin. The precursor may be a monomer or an oligomer which is capable of creating a transparent resin through the curing thereof by the irradiation of radiation. The resins and precursor can be employed singly or in combination of two or more kinds thereof.

The pigment carrier can be employed at a ratio ranging from 30 to 700 parts by weight, more preferably 60 to 450 parts by weight based on 100 parts by weight of the pigments in the color composition.

In a case where a mixture consisting of a transparent resin and the precursor thereof are to be employed as a pigment carrier, the transparent resin can be employed at a ratio ranging from 20 to 400 parts by weight, more preferably 50 to 250 parts by weight based on 100 parts by weight of the pigments in the color composition.

Further, the precursor of the transparent resin can be employed at a ratio ranging from 10 to 300 parts by weight, more preferably 10 to 200 parts by weight based on 100 parts by weight of the pigments in the color composition.

As for the thermoplastic resin, it is possible to employ, for example, a butyral resin, styrene-maleic acid copolymer, chlorinated polyethylene, chlorinated polypropylene, polyvinyl chloride, vinyl chloride-vinyl acetate copolymer, polyvinyl acetate, polyurethane resin, polyester resin, acrylic resin, alkyd resin, polystyrene, polyamide resin, rubber type resin, cyclized rubber-based resin, celluloses, polybutadien, polyethylene, polypropylene, polyimide, etc.

As for the thermosetting resin, it is possible to employ, for example, an epoxy resin, benzoguanamine resin, rosin-modified maleic resin, rosin-modified fumaric acid resin, melamine resin, urea resin, phenol resin, etc.

As for the photosensitive resin, it is possible to employ resins having a linear macromolecule into which a photo-curable group such as a (metha)acryloyl group, styryl group, etc. has been introduced through a reaction between a linear macromolecule having a reactive substituent group, such as hydroxyl group, carboxyl group, amino group, etc. and a (metha)acrylic compound having a reactive substituent group such as an isocyanate group, aldehyde group, epoxy group, etc. or cinnamic acid.

It is also possible to employ a linear macromolecule containing an acid anhydride, such as a styrene-maleic anhydride copolymer or α-olefin-maleic anhydride copolymer half-esterified with a (metha)acrylic compound having an hydroxyl group, such as hydroxyalkyl(metha)acrylate.

As for specific examples of the monomers and oligomers which are the precursors of the transparent resin, they include various kinds of acrylic esters and methacrylic esters such as 2-hydroxyethyl(metha)acrylate, 2-hydroxypropyl(metha)acrylate, cyclohexyl(metha)acrylate, polyethyleneglycol di(metha)acrylate, pentaerythritol tri(metha)acrylate, trimethylolpropane(metha)acrylate, dipentaerythritol hexa(metha)acrylate, tricyclodecanyl(metha)acrylate, melamine (metha)acrylate, epoxy(metha)acrylate, etc.; (metha)acrylic acid; styrene; vinyl acetate; (metha)acryl amide; N-hydroxymethyl(metha)acryl amide; acrylonitrile; etc. These compounds can be employed either singly or as a mixture of two or more kinds thereof.

If the color composition is desired to be cured through the irradiation of ultraviolet rays, a photo-polymerization initiator may be added to the color composition.

As for specific examples of the photo-polymerization initiator useful in this case, they include an acetophenone-based photo-polymerization initiator such as 4-phenoxy dichloroacetophenone, 4-t-butyl-dichloroacetophenone, diethoxyacetophenone, 1-(4-isopropylphenyl)-2-hydroxy-2-methylpropan-1-one, 1-hydroxycyclohexylphenyl ketone, 2-methyl-1-[4-(methylthio)phenyl]-2-morpholinopropane-1-one, 2-benzyl-2-diamino-1-(4-morpholinophenyl)-butan-1-one; a benzoin-based photo-polymerization initiator such as benzoin, benzoin methyl ether, benzoin ethyl ether, benzoin isopropyl ether, benzyldimethyl ketal, etc.; a benzophenone-based photo-polymerization initiator such as benzophenone, benzoylbenzoic acid, benzoylmethyl benzoate, 4-phenyl benzophenone, hydroxybenzophenone, acrylated benzophenone, 4-benzoyl-4'-methyldiphenyl sulfide, etc.; a thioxanthone-based photo-polymerization initiator such as thioxanthone, 2-chlorothioxanthone, 2-methylthioxanthone, isopropylthioxanthone, 2,4-diisopropylthioxanthone, etc.; a triazine-based photo-polymerization initiator such as 2,4,6-trichloro-s-triazine, 2-phenyl-4,6-bis(trichloromethyl)-s-triazine, 2-(p-methoxyphenyl)-4,6-bis(trichloromethyl)-s-triazine, 2-(p-tolyl)-4,6-bis(trichloromethyl)-s-triazine, 2-piperonyl-4,6-bis(trichloromethyl)-s-triazine, 2,4-bis(trichloromethyl)-6-styryl-s-triazine, 2-(naphtho-1-yl)-4,6-bis(trichloromethyl)-s-triazine, 2-(4-methoxynaphtho-1-yl)-4,6-bis(trichloromethyl)-s-triazine, 2,4-trichloromethyl-(piperonyl)-6-triazine, 2,4-trichloromethyl(4'-methoxystyryl)-6-triazine, etc.; a borate-based photo-polymerization initiator; a carbazole-based photo-polymerization initiator; an imidazole-based photo-polymerization initiator; etc.

These photo-polymerization initiators can be employed at a ratio ranging from 5 to 200 parts by weight, more preferably 10 to 150 parts by weight based on 100 parts by weight of the pigments in the color composition.

The aforementioned photo-polymerization initiators can be employed either singly or as a mixture of two or more kinds thereof. Further, these photo-polymerization initiators can be employed in combination with a sensitizer, examples of which including α-acyloxy ester, acylphosphine oxide, methylphenyl glyoxylate, benzyl, 9,10-phenanthrene quinone, camphor quinine, ethylanthraquinone, 4,4'-diethyl isophthalophenone, 3,3',4,4'-tetra(t-butyl peroxycarbonyl)benzophenone, etc.

These sensitizers can be employed at a ratio ranging from 0.1 to 60 parts by weight based on 100 parts by weight of the photo-polymerization initiator.

The color composition may further comprise a polyfunctional thiol which is capable of acting as a chain-transfer agent. As for this polyfunctional thiol, it is possible to employ a compound having two or more thiol groups. Specific examples of such a compound include hexane dithiol, decane dithiol, 1,4-butanediol bisthiopropionate, 1,4-butanediol bisthioglycolate, ethyleneglycol bisthioglycolate, ethyleneglycol bisthiopropionate, trimethylolpropane tristhioglycolate, trimethylolpropane tristhiopropionate, trimethylolpropane tris(3-mercaptobutylate), pentaerythritol tetrakisthioglycolate, pentaerythritol tetrakisthiopropionate, trimercaptopropionate tris(2-hydroxyethyl)isocyanulate, 1,4-dimethylmercaptobenzene, 2,4,6-trimercapto-s-triazine, 2-(N,N-dibutylamino)-4,6-dimercapto-s-triazine, etc. These polyfunctional thiols can be employed singly or in combination of two or more kinds.

The mixing ratio of these polyfunctional thiols should preferably be confined within the range of 0.2 to 150 parts by weight, more preferably 0.2 to 100 parts by weight based on 100 parts by weight of the pigments in the color composition.

The color composition may further contain a solvent for enabling the pigments to be sufficiently dispersed in the pigment carrier and for enabling the color composition to be coated on the surface of a transparent substrate such as a glass substrate, thereby making it possible to easily create a layer of a filter segment having a hardened film thickness of 0.2-5 μm. Specific examples of such a solvent include, for example, cyclohexanone, ethyl Cellosolve acetate, butyl Cellosolve acetate, 1-methoxy-2-propyl acetate, diethyleneglycol dimethyl ether, ethyl benzene, ethyleneglycol diethyl ether, xylene, ethyl Cellosolve, methyl-n amyl ketone, propyleneglycol monomethyl ether, toluene, methylethyl ketone, ethyl acetate, methanol, ethanol, isopropyl alcohol, butanol, isobutyl ketone, petroleum solvent, etc. These solvents may be employed singly or in combination of two or more kinds.

The mixing ratio of these solvents should preferably be confined within the range of 800 to 4000 parts by weight, more preferably 1000 to 2500 parts by weight based on 100 parts by weight of the pigments in the color composition.

The color composition can be manufactured by finely dispersing one or more kinds of pigments, if required, together with the aforementioned photo-polymerization initiator in a pigment carrier as well as in an organic solvent. As for the means for carrying out the dispersion in this case, it is possible to employ a triple roll mill, a twin-roll mill, a sand mill, a kneader, an attritor, etc. Further, in the case of a color composition containing two or more kinds of pigments, each of the pigments may be separately finely dispersed in a pigment carrier as well as in an organic solvent to obtain a dispersion, which is then mixed with other dispersion(s) prepared in the same manner as described above.

On the occasion of dispersing pigments in a pigment carrier as well as in an organic solvent, a dispersing agent such as a resin type pigment dispersing agent, a surfactant, a pigment derivative, etc. can be optionally employed.

Since this dispersing agent is excellent in enhancing the dispersibility of pigments and in its effects in preventing the re-flocculation of pigments after the dispersion thereof, the employment of a color composition in which the pigments are dispersed in a pigment carrier and an organic solvent by making use of this dispersing agent is advantageous in obtaining a color filter with color display pixels excellent in transparency. The mixing ratio of the dispersing agent should preferably be confined within the range of 0.1 to 40 parts by weight, more preferably 0.1 to 30 parts by weight based on 100 parts by weight of the pigments in the color composition.

The resin type pigment dispersing agent is formed of a compound having not only a pigment affinity moiety exhibiting pigment-adsorbing properties, but also another moiety exhibiting compatibility with a pigment carrier, thereby enabling the dispersing agent to adsorb onto the pigment and to stabilize the dispersion of the pigment in the pigment carrier.

As for specific examples of the resin type pigment dispersing agent, they include polyurethane, polycarboxylate such as polyacrylate, unsaturated polyamide, polycarboxylic acid, (partial) amine polycarboxylate, ammonium polycarboxylate, alkyl amine polycarboxylate, polysiloxane, long chain polyaminoamide phosphate, hydroxyl group-containing polycarboxylate and modified compounds thereof, an oily dispersing agent such as amide to be formed through a reaction between poly(lower alkyl imine) and polyester having a free carboxyl group and salts of the amide, (metha)acrylic acid-styrene copolymer, (metha)acrylic acid-(metha)acrylate copolymer, styrene-maleic acid copolymer, polyvinyl alcohol, water-soluble resin or water-soluble macromolecular compound such as poly(vinyl pyrrolidone), polyester compounds, modified polyacrylate compounds, ethylene oxide/propylene oxide adduct, phosphate, etc. These compounds may be employed individually or in combination of two or more kinds.

As for this surfactant, it is possible to employ an anionic surfactant such as polyoxyethylene alkylether sulfate, dodecylbenzene sodium sulfonate, alkali salts of styrene-acrylic acid copolymer, alkylnaphthaline sodium sulfonate, alkyldiphenyl ether sodium disulfonate, monoethanol amine lauryl sulfate, triethanol amine lauryl sulfate, ammonium lauryl sulfate, monoethanol amine stearate, sodium stearate, sodium lauryl sulfate, monoethanol amine of styrene-acrylic acid copolymer, polyoxyethylene alkylether phosphate, etc.; a nonionic surfactant such as polyoxyethylene oleyl ether, polyoxyethylene lauryl ether, polyoxyethylene nonylphenyl ether, polyoxyethylene alkylether phosphate, polyoxyethylene sorbitan monostearate, polyethyleneglycol monolaurate, etc.; cationic surfactant such as alkyl quaternary ammonium salt and an ethylene oxide adduct thereof, etc.; and an amphoteric surfactant such as an alkyl betaine such as betaine alkyldimethyl aminoacetate, alkylimidazoline, etc. These surfactants can be employed singly or in combination of two or more kinds.

The pigment derivative is formed of a compound comprising an organic pigment having a substituent group introduced therein and should preferably be selected from those whose hue is close to the hue of the pigment to be used. However, when the mixing ratio of pigment derivatives is relatively small, they may be selected from those whose hue differs from the hue of the pigment to be used.

The organic pigment herein includes aromatic polycyclic compounds exhibiting a light yellow color, such as naphthalene-based compounds and anthraquinone-based compounds, which are generally not called pigments. As for specific examples of the pigment derivatives, it is possible to employ those described in JP-A 63-305173 (KOKAI), JP Patent Publication 57-15620, JP Patent Publication 59-40172, JP Patent Publication 63-17102 and JP Patent Publication 5(1993)-9469. Especially, since pigment derivatives having a basic group are highly effective in the dispersion of pigment, they can be preferably employed. These pigment derivatives may be employed singly or in combination of two or more kinds.

The color composition may further contain a storage stabilizing agent for stabilizing the change of viscosity of the composition in time. As for specific examples of the storage stabilizing agent, they include, for example, quaternary ammonium chlorides such as benzyltrimethyl chloride, diethylhydroxy amine, etc.; organic acids such as lactic acid, oxalic acid, etc. and methyl ethers thereof; t-butyl pyrocatechol; organic phosphine such as tetraethyl phosphine, tetraphenyl phosphine, etc.; phosphite; etc. The storage stabilizing agent can be employed at a ratio of 0.1-10 parts by weight based on 100 parts by weight of the pigment in a color composition.

The color composition may further contain an adherence improver, such as a silane coupling agent, for the purpose of enhancing the adhesion to a substrate.

As for specific examples of the silane coupling agent, they include vinyl silanes such as vinyl tris(β-methoxyethoxy) silane, vinylethoxy silane, vinyltrimethoxy silane, etc.; (metha)acrylsilanes such as γ-methacryloxypropyl silane, etc.; epoxy silanes such as β-(3,4-epoxycyclohexyl)ethyltrimethoxy silane, β-(3,4-epoxycyclohexyl)methyltrimethoxy silane, β-(3,4-epoxycyclohexyl)ethyltriethoxy silane, β-(3,4-epoxycyclohexyl)methyltriethoxy silane, γ-glycidoxypropyl trimethoxy silane, γ-glycidoxypropyl triethoxy silane, etc.; amino silanes such as N-β(aminoethyl) γ-aminopropyl trimethoxy silane, N-β(aminoethyl) γ-aminopropyl triethoxy silane, N-β(aminoethyl) γ-aminopropyl methyldiethoxy silane, γ-aminopropyl triethoxy silane, γ-aminopropyl trimethoxy silane, N-phenyl-γ-aminopropyl trimethoxy silane, N-phenyl-γ-aminopropyl triethoxy silane, etc.; and thiosilanes such as γ-mercaptopropyl trimethoxy silane, γ-mercaptopropyl triethoxy silane, etc. These silane coupling agents can be employed at a ratio of 0.01-100 parts by weight based on 100 parts by weight of the pigment in a color composition.

The color composition can be formulated as a gravure offset printing ink, a waterless offset printing ink, a silk screen printing ink, or a solvent developing type or alkaline developing type color resist. The color resist is formulated such that the pigment(s) is dispersed in a composition comprising a thermoplastic resin, thermosetting resin or photosensitive resin, a monomer, a photo-polymerization initiator and an organic solvent.

The pigment should preferably be incorporated at a ratio of 5-70% by weight based on the quantity (100% by weight) of solids of the color composition. More preferably, the pigment should be incorporated at a ratio of 20-50% by weight, the balance being substantially constituted by a resinous binder that can be provided by a pigment carrier.

The color composition should preferably be formulated such that bulky particles 5 μm or more in size, preferably, bulky particles 1 μm or more in size, more preferably, bulky particles 0.5 μm or more in size as well as particles intermingled therein are completely removed from the composition by making use of any suitable means such as centrifugal separation, sintered filter, membrane filter, etc.

The color filter according to one embodiment of the present invention is provided, on a transparent substrate, with a red pixel, a green pixel and a blue pixel, all of which can be formed by means of printing or photolithography using each of the aforementioned color compositions.

As for the transparent substrate, it is possible to employ a glass plate made of a material such as a soda-lime glass, low alkali borosilicate glass, alkaliless almino borosilicate glass, etc; and a resin plate made of a material such as polycarbonate, poly(methyl methacrylate), polyethylene terephthalate, etc. For the purpose of driving the liquid crystal after the fabrication of a liquid crystal panel, a transparent electrode consisting of a combination of metal oxides such as indium oxide, tin oxide, zinc oxide, antimony oxide may be formed on the surface of the glass plate or resin plate.

Since the patterning of these color segments by means of printing can be performed by simply repeating the printing and drying of a color composition that has been prepared as various kinds of printing inks, the printing method is advantageous as a manufacturing method of a color filter in terms of manufacturing cost and mass production. Further, due to the recent developments in printing techniques, it is now possible to perform the printing of a very fine pattern which is excellent in dimensional precision as well as smoothness. In order to perform the printing, the ink should preferably be formulated such that it cannot be dried or solidified on the surface of a printing plate or blanket. Furthermore, it is also important to control the fluidity of ink on the surface of the printing machine, so that it may be advisable to adjust the ink viscosity by making use of a dispersant or an extender pigment.

The inkjet method is a method wherein an inkjet apparatus having a plurality of small injection ports (inkjet head) are arrayed for each color is employed, and the printing is directly performed on a transparent substrate or a substrate having an active element, such as a TFT formed thereon.

When each of the colored pixels is to be formed by means of photolithography, a color composition which has been formulated as a solvent developing type or alkaline developing type color resist is coated on the surface of the transparent substrate by any desired method of coating, such as spray coating, spin coating, slit coating, roll coating, etc., thereby forming a layer having a thickness (as dried) of 0.2-10 μm.

On the occasion of drying the coated layer, it may be performed by making use of a vacuum dryer, convection oven, IR oven, hot plate, etc. The layer thus dried as required is then subjected to the exposure to ultraviolet rays through a mask having a predetermined pattern and disposed in or out of contact with this layer.

Subsequently, the resultant layer is dipped in a solvent or an alkaline developing solution or sprayed with a developing solution by means of a spraying machine, thereby removing the uncured portion, to obtain a desired pattern. Thereafter, the same procedures are repeated for other colors, thus manufacturing a color filter.

Further, for the purpose of promoting the polymerization of the color resist, heating may be applied to the coated resist. According to this photolithography method, it is possible to manufacture a color filter which is further excellent in precision as compared with that obtained from the aforementioned printing methods.

On the occasion of performing the development, an aqueous solution such as sodium carbonate, sodium hydroxide, etc. can be employed as an alkaline developing solution. It is also possible to employ an organic alkali such as dimethylbenzyl amine, triethanol amine, etc. Further, the developing solution may contain a defoaming agent or a surfactant. As for the developing treatment, it is possible to employ a shower developing method, a spray developing method, a dip developing method, a paddle developing method, etc.

Incidentally, in order to enhance the sensitivity to ultraviolet exposure, a water-soluble or alkali-soluble resin such as, for example, polyvinyl alcohol or a water-soluble acrylic resin may be coated on the color resist that has been coated and dried in advance, thereby forming a film which is capable of minimizing the effects of oxygen to obstruct the polymerization. Thereafter, the color resist is subjected to ultraviolet exposure.

The color filter according to the present invention can be manufactured by means of an electrodeposition method, a transfer method or inkjet method other than the aforementioned methods. The electrodeposition method is a method which is featured in that, by taking advantage of a transparent conductive film formed on the surface of a transparent substrate, each of the color filter segments is electrodeposited on the transparent conductive film through the effects of electrophoresis of colloidal particles, thereby manufacturing the color filter.

On the other hand, the transfer method is a method which is featured in that a color filter layer is formed in advance on the surface of a releasable transfer base sheet and then this color filter layer is transferred onto a desired transparent substrate.

Next, a liquid crystal display device which is equipped with the color filter of the present invention will be explained.

FIG. 2 is a cross-sectional view schematically illustrating the liquid crystal display device which is provided with the color filter of the present invention. The liquid crystal display device 4 shown in FIG. 2 illustrates a typical example of a TFT drive type liquid crystal display device for use in a notebook-sized personal computer. This liquid crystal display device 4 is provided with a pair of transparent substrates 5 and 6, which are arranged face to face with a gap interposed therebetween. The gap between them is filled with a liquid crystal (LC).

This LC is aligned depending on the kind of driving mode, such as TN (Twisted Nematic), STN (Super Twisted Nematic), IPS (In-Plane switching), VA (Vertical Alignment), OCB (Optically Compensated Birefringence), etc.

On the inner wall of the first transparent substrate 5, there is formed a TFT (thin film transistor) array 7. On this TFT array 7 is deposited a transparent electrode layer 8 formed of ITO, for example. On this transparent electrode layer 8 is further provided an alignment layer 9. Further, a polarizer (polarizing plate) 10, comprising an optical retardation film, is formed on the outer surface of the transparent substrate 5.

On the other hand, on the inner wall of the second transparent substrate 6, there is formed a color filter 11 according to one embodiment of the present invention. The red, green and blue filter segments constituting the color filter 11 are separated from each other by a black matrix (not shown). If required, a transparent protective film (not shown) may be formed so as to cover the color filter 11. Furthermore, a transparent electrode layer 12, formed of ITO for example, is formed on this protective film. An alignment layer 13 is deposited so as to cover the transparent electrode layer 12. Further, a polarizer 14 is formed on the outer surface of the transparent substrate 6. Incidentally, a backlight unit 16 equipped with a triple wavelength lamp 15 is disposed below the polarizer 10.

As explained above, even if there is a possibility that the values of perpendicular optical retardation of red, green and blue colored pixels constituting the color filter may be brought into a discontinuous state due to the specific selection of pigments to be used or due to the pulverization of pigments in an attempt to obtain a color filter of further enhanced contrast, since there is employed a retardation-regulating agent having at least one planar structure group and a photopolymerizable group or a thermally polymerizable group on at least two different portions of the planar structure group, it is now possible to provide a coloring composition for a color filter that is capable of regulating the values of perpendicular optical retardation to take optimum values so as to make them continuous.

Furthermore, when such a coloring composition for a color filter is employed for the manufacture of a color filter, it is possible to obtain a color filter having a continuous state satisfying the conditions of: $Rth(R) \geqq Rth(G) \geqq Rth(B)$ or $Rth(R) \leqq Rth(G) \leqq Rth(B)$.

When a liquid crystal display device is manufactured by making use of such a color filter so as to satisfy the optical characteristics of the optical compensation layer and other constituent members, especially to satisfy the wavelength dispersing characteristics of retardation, it is possible to prevent the generation of non-uniformity of the polarized state of light passing through the display region of each colored pixel, thus making it possible to obtain a liquid display device which is excellent in oblique viewing angle display. Further, since the black color display is compensated in oblique viewing angle, it is possible to reproduce a black color which is minimized in color shifting and excellent in neutrality, thus exhibiting highly excellent display characteristics.

As explained above, according to the present invention, since it is possible to regulate the retardation, which is specific to each color filter, it is possible to minimize the difference in perpendicular optical retardation of each color even though the color filter that can be obtained is of a high quality exhibiting a contrast value of not less than 1000 or not less than 3000.

Furthermore, since the kinds of pigments to be employed are specifically selected and dispersed in a transparent resin, it is now possible to further enhance the axial visibility.

When a liquid crystal display device is manufactured by making use of such a color filter, it is possible to minimize the non-uniformity of the polarized state of light passing through the display region of each colored pixel, thus making it possible to obtain a liquid display device which is excellent not only in oblique visibility but also in axial visibility.

EXAMPLES

Although specific examples of the present invention will be explained below, it should not be construed that the present invention is limited to these examples. Further, as the materials to be employed in these examples are very sensitive to light, it is required to prevent the sensitization of the materials by redundant light such as natural light by performing all necessary tasks under yellow or red light.

Incidentally, "part(s)" in the following examples and comparative examples means "weight part(s)". Further, the symbols of pigments are indicated by a color index number. For example, "PR254" means "C.I. Pigment Red 254", and "PY150" means "C.I. Pigment Yellow 150".

The following Table 1 illustrates the pigment derivatives employed in the following examples.

TABLE 1

| Pigment derivatives | Chemical structure |
|---|---|
| D-1 | [structure: diketopyrrolopyrrole (DPP) with diphenyl substituents, bearing —SO₂NH(CH₂)₃N(CH₃)₂ groups, n=1~2] |
| D-2 | [structure: bis-anthraquinone linked with triazine units bearing —NH(CH₂)₃N(C₂H₅)₂ substituents] |
| D-3 | [structure: azo compound with triazine bearing N(C₂H₅)₂(CH₂)₃NH— and NH(CH₂)₃N(C₂H₅)₂ groups, linked via phenyl-azo to acetoacetyl-benzimidazolone] |
| D-4 | [CuPc]—SO₂NH(CH₂)₃N(C₂H₅)₂ |

CuPc: Residual group of copper phthalocyanine a) Manufacture of Refined Pigment

A refined pigment to be used in Examples and Comparative Examples was manufactured according to the following methods. Then, the primary particle diameter d50 of pigments thus obtained was calculated by taking the pictures of the pigments in the view by making use of a transmission electron microscope JEM-2010 (manufactured by Japan Electron Co., Ltd.) and by performing the image analysis of the pictures. The primary particle diameter d50 herein represents a particle diameter (a diameter of equivalent circle) which corresponds to a particle diameter as measured where an integrated quantity in the cumulative curve of number particle size distribution is 50% of the total quantity. The cumulative curve of number particle size distribution is obtained by plotting the mean value of the major axis and minor axis of 100 primary particles of each pigment, constituting the aggregate on the two-dimentional image, with respect to the number of the particles.

Manufacturing Example 1

100 parts (based on weight, the same hereinafter) of a diketopyrrolopyrrol-based red pigment PR254 (Ciba Speciality Chemicals Co., Ltd. "IRGAPHOR RED B-CF"; R-1), 18 parts of a dye derivative (D-2), 1000 parts of pulverized sodium chloride, and 120 parts of diethylene glycol were put into a 1 gallon stainless steel kneader (Inoue Seisakusho Co., Ltd.) and kneaded for 10 hours at a temperature of 60° C.

Then, the resultant mixture was introduced into 2000 parts of hot water and stirred for about one hour by means of a high-speed mixer while heating it at a temperature of about 80° C. to obtain a slurry product. This slurry product was then subjected to repeated filtration and water washing to remove sodium chloride, and the solvent was dried for 24 hours at a temperature of 80° C. to obtain 115 parts of a salt milling-treated pigment (Red-2). The primary particle diameter of the pigment thus obtained is shown in the following Table 2.

Manufacturing Example 2

100 parts (based on weight, the same hereinafter) of anthraquinone-based red pigment PR177 (Ciba Speciality Chemicals Co., Ltd. "CROMOPHTAL RED A2B), 8 parts of a dye derivative (D-2), 700 parts of pulverized sodium chloride, and 180 parts of diethylene glycol were put into a 1 gallon stainless steel kneader (Inoue Seisakusho Co., Ltd.) and kneaded for 4 hours at a temperature of 70° C. Then, the resultant mixture was introduced into 4000 parts of hot water and stirred for about one hour by means of a high-speed mixer while heating it at a temperature of about 80° C. to obtain a slurry product. This slurry product was then subjected to repeated filtration and water washing to remove sodium chloride, and the solvent was dried for 24 hours at a temperature of 80° C. to obtain 102 parts of a salt milling-treated pigment (Red-3). The primary particle diameter of the pigment thus obtained is shown in the following Table 2.

Manufacturing Example 3

170 parts of tert-amyl alcohol was poured into a sulfonated flask in a nitrogen atmosphere and then 11.04 parts of sodium was added to the tert-amyl alcohol to obtain a mixture which was then heated at a temperature of 92-102° C. to melt the sodium. While vigorously stirring the molten sodium, the mixture was kept overnight at a temperature of 100-107° C. Then, a solution containing 44.2 parts of 4-chlorobenzonitrile and 37.2 parts of diisopropyl succinate, which were dissolved in advance at 80° C. in 50 parts of tert-amyl alcohol, was slowly added to the aforementioned mixture over two hours at a temperature of 80-98° C. Then, the resultant reaction mixture was further stirred for three hours at 80° C., and concurrently 4.88 parts of diisopropyl succinate was added dropwise to the reaction mixture. This reaction mixture was cooled to room temperature and then 270 parts of methanol, 200 parts of water and 48.1 parts of concentrated sulfuric acid were added to this reaction mixture at a temperature of 20° C. Then, the resultant mixture was stirred for 6 hours at a temperature of 20° C. The resultant red mixture was subjected to filtration and then washed with methanol and water and allowed dry to obtain 46.7 parts of red pigment (R-4). The primary particle diameter of the pigment thus obtained is shown in the following Table 2.

Manufacturing Example 4

120 parts of copper phthalocyanine halide-based green pigment PG36 (Toyo Ink Manufacturing Co., Ltd. "LIONOL GREEN 6YK"), 1600 parts of pulverized sodium chloride, and 270 parts of diethylene glycol were put into a 1 gallon stainless steel kneader (Inoue Seisakusho Co., Ltd.) and kneaded for 12 hours at a temperature of 70° C. Then, the resultant mixture was introduced into 5000 parts of hot water and stirred for about one hour by means of a high-speed mixer while heating it at a temperature of about 70° C. to obtain a slurry product. This slurry product was then subjected to repeated filtration and water washing to remove sodium chloride, and the solvent was dried for 24 hours at a temperature of 80° C. to obtain 117 parts of a salt milling-treated pigment (G-1). The primary particle diameter of the pigment thus obtained is shown in the following Table 2.

Manufacturing Example 5

46 parts of zinc phthalocyanine was dissolved in a molten salt consisting of 356 parts of aluminum chloride and 6 parts of sodium chloride and heated to a temperature of 200° C. Then, the resultant solution was cooled down to 130° C. and stirred for one hour. Thereafter, the reaction temperature was raised up to 180° C. and bromine was added drop-wise at a rate of 10 parts per hour to this reaction mixture over 10 hours. Then, chlorine was added drop-wise at a rate of 0.8 parts per hour to this reaction mixture over 5 hours. The resultant reaction mixture was gradually poured into 3200 parts of water and then subjected to filtration and water washing to obtain 107.8 parts of crude zinc phthalocyanine halide pigment.

The average number of bromine atoms included in one molecule of this crude zinc phthalocyanine halide pigment was 14.1 and the average number of chlorine atoms included in one molecule of this crude zinc phthalocyanine halide pigment was 1.9. Then, 120 parts of this crude zinc phthalocyanine halide pigment, 1600 parts of pulverized sodium chloride, and 270 parts of diethylene glycol were put into a 1 gallon stainless steel kneader (Inoue Seisakusho Co., Ltd.) and kneaded for 12 hours at a temperature of 70° C. Then, the resultant mixture was poured into 5000 parts of hot water and stirred for about one hour by means of a high-speed mixer while heating it at a temperature of about 70° C. to obtain a slurry product. This slurry product was then subjected to repeated filtration and water washing to remove sodium chloride and the solvent was dried for 24 hours at a temperature of 80° C. to obtain 117 parts of a salt milling-treated pigment (G-2). The primary particle diameter of the pigment thus obtained is shown in the following Table 2.

Manufacturing Example 6

150 parts of water was poured into a separation flask and then 63 parts of 35% hydrochloric acid was added with stirring to the water to obtain a solution of hydrochloric acid. Then, while taking care of foaming reaction, 38.7 parts of benzene sulfonyl hydrazide was added to the solution and ice was added to the solution until the temperature of solution was cooled down to 0. After this cooling, 19 parts of sodium nitrite was added to the solution and stirred for 30 minutes at a temperature ranging from 0 to 15° C. Subsequently, sulfamic acid was continuously added to the solution until the coloration of potassium iodide-starch paper could not be recognized any longer.

Furthermore, 25.6 parts of barbituric acid was added to the solution and then the temperature of the resultant solution was raised up to 55° C. and then stirred for 2 hours. Additionally, 25.6 parts of barbituric acid was added to the solution and then the temperature of the resultant solution was raised up to 80° C. and sodium hydroxide was continuously added to the solution until the pH thereof became 5. The resultant solution was stirred for 3 hours at a temperature of 80° C. and then the temperature of the solution was allowed drop to 70° C. Then, the solution was subjected to filtration and washing with hot water. The press cake thus obtained was dissolved in 1200 parts of hot water to obtain a slurry matter, which was then stirred for two hours at a temperature of 80° C. Subsequently, while keeping this temperature, the slurry matter was subjected to filtration and to hot water washing by making use of 2000 parts of hot water heated to 80° C. As a result, it was possible to confirm that benzene sulfonamide was shifted to the filtrate.

The press cake thus obtained was dried at a temperature of 80° C. to obtain 61.0, parts of disodium salt of azobarbituric acid. Then, 200 parts of water was poured into a separation flask and then 8.1 parts of disodium azobarbiturate powder was added with stirring to the water and dispersed therein. The solution having disodium azobarbiturate powder homogeneously dispersed therein was heated up to 95° C. and then 5.7 parts of melamine and 1.0 parts of diarylaminomelamine were added to the solution.

Furthermore, a green color solution, which was obtained by dissolving 6.3 parts of cobalt chloride (II) hexahydrate in 30 parts of water, was added drop-wise to the aforementioned solution over 30 minutes. After finishing the addition of the green color solution, the complexation was allowed to take place in the solution for 1.5 hours at a temperature of 90° C. Subsequently, the pH of the solution was adjusted to 5.5 and 20.4 parts of the emulsified solution composed of 4 parts of xylene, 0.4 part of sodium oleate and 16 parts of water was added to the previously-mentioned solution and the resultant solution was stirred for 4 hours under heating. The resultant solution was then cooled down to 70° C. and immediately subjected to filtration and repeated water washing using hot water heated to 70° C. until the inorganic salts were washed away. Subsequently, the product was subjected to drying and crushing processes to obtain 14 parts of azo-based yellow pigment (Y-2). The primary particle diameter of the pigment thus obtained is shown in the following Table 2.

Manufacturing Example 7

100 parts of copper phthalocyanine-based blue pigment PB15:6 (Toyo Ink Manufacturing Co., Ltd. "LIONOL BLUE ES"), 800 parts of pulverized sodium chloride, and 100 parts of diethylene glycol were put into a 1 gallon stainless steel kneader (Inoue Seisakusho Co., Ltd.) and kneaded for 12 hours at a temperature of 70° C. Then, the resultant mixture was introduced into 3000 parts of hot water and stirred for about one hour by means of a high-speed mixer while heating it at a temperature of about 70° C. to obtain a slurry product. This slurry product was then subjected to repeated filtration and water washing to remove sodium chloride, and the solvent was dried for 24 hours at a temperature of 80° C. to obtain 98 parts of a salt milling-treated pigment (B-1). The primary particle diameter of the pigment thus obtained is shown in the following Table 2.

TABLE 2

| Colors | Symbols | Av. primary particle diameter (nm) |
|---|---|---|
| RED | R-1 | 68.8 |
|  | R-2 | 24.8 |
|  | R-3 | 28.1 |
|  | R-4 | 23.2 |
| GREEN | G-1 | 22.4 |
|  | G-2 | 24.3 |
| YELLOW | Y-1 | 99.5 |
|  | Y-2 | 25.2 |
| BLUE | B-1 | 28.3 |

Y-1: PY150 (Lancees Co., Ltd. "E4GN")

b) Preparation of a Solution of Acrylic Resin 800 parts of cyclohexanone was put into a reaction vessel and heated at a temperature of 100° C. while introducing nitrogen gas into the reaction vessel and then, while maintaining this temperature, a mixture comprising the following monomers and thermal polymerization initiator was added drop-wise to the cyclohexanone over one hour, thereby allowing a polymerization reaction to take place.

| | |
|---|---|
| Styrene | 60.0 parts |
| Methacrylic acid | 60.0 parts |
| Methyl methacrylate | 65.0 parts |
| Butyl methacrylate | 65.0 parts |
| Azobis-isobutyronitrile | 10.0 parts |

After finishing the addition of the aforementioned mixture, the reaction of this mixture was further allowed to take place for 3 hours at a temperature of 100° C. Thereafter, a solution consisting of 2.0 parts of azobis-isobutyronitrile, which was dissolved in 50 parts of cyclohexanone, was added to the reaction mixture and the reaction thereof was continued for one hour at a temperature of 100° C. to obtain a resin solution. After being cooled down to room temperature, about 2 g of this resin solution was sampled out and thermally dried for 20 minutes at a temperature of 180° C. to measure the amount of nonvolatile matter. A suitable amount of cyclohexanone was added to the resin solution that had been synthesized in advance so as to make the ratio of the nonvolatile matter 20% by weight, thus preparing an acrylic resin solution.

c) Preparation of Pigment Dispersion

A mixture having a composition (weight ratio) shown in the following Table 3 was homogeneously stirred and then, by making use of zirconia beads having a diameter of 1 mm, the dispersion of the components of the composition was performed for 5 hours by means of a sand mill, and the resultant product was subjected to filtration by making use of a 5 μm filter to obtain a pigment dispersion of each color.

TABLE 3

| Pigment dispersions | | RP-1 | RP-2 | RP-3 | GP-1 | GP-2 | BP-1 |
|---|---|---|---|---|---|---|---|
| Pigments | 1st pigment | R-1 | R-2 | R-4 | G-1 | G-1 | B-1 |
|  | 2nd pigment | R-3 | R-3 | R-3 | Y-1 | Y-2 | — |
| Pigment derivative | | D-1 | D-1 | D-1 | D-3 | D-3 | D-4 |
| Composition | 1st pigment | 9.6 | 9.6 | 9.6 | 8.3 | 8.3 | 9.6 |
|  | 2nd pigment | 1.1 | 1.1 | 1.1 | 5.4 | 5.4 | 0.4 |
|  | 3rd pigment | — | — | — | 0.0 | 0.0 | 0.0 |
|  | Pigment derivative | 1.3 | 1.3 | 1.3 | 1.8 | 1.8 | 2.0 |
|  | Acrylic resin solution | 40.0 | 40.0 | 40.0 | 36.5 | 36.5 | 40.0 |
|  | Organic solvent | 48.0 | 48.0 | 48.0 | 48.0 | 48.0 | 48.0 |
|  | Total | 100.0 | 100.0 | 100.0 | 100.0 | 100.0 | 100.0 |

Monomer: trimethyrolpropane triacrylate (NK Ester ATMPT; Shin-Nakamura Kagaku Co., Ltd.)

Photopolymerization-initiator: 2-methyl-1-[4-(methylthio)phenyl]-2-morphorinopropane-1-one (Irgar Cure 907; Ciba Speciality Chemicals Co., Ltd.)

Sensitizer: 4,4'-bis(diethylamino)benzophenone (EAB-F; Hodogaya Chemicals Co.)

Organic solvent: cyclohexanone d) Retardation Regulating Agent

The following commonly available compounds available were employed as retardation regulating agents.

| Melamine compound | Nippon Carbide Industries Co. (product name: NIKALAC MX-750) |
| Porphyrin compound | Tokyo Kasei Industries Co. (product name: TETRAPHENYL PORPHYRIN) |
| Epoxy compound | Japan Epoxy Resin Co. (product name: Epicoat 828) | e) Preparation of Coloring Composition (Hereinafter Referred to as Color Resist)

A mixture having a composition (weight ratio) shown in the following Table 4 was homogeneously stirred and then subjected to filtration by making use of a 1 μm filter, thereby obtaining resists of various colors.

ture, the substrate was exposed to ultraviolet rays by making use of an ultra-high pressure mercury lamp. Thereafter, the resultant substrate was subjected to spray development by making use of an aqueous solution of sodium carbonate heated up to 23° C., after which the resultant substrate was washed with ion-exchange water and air-dried. Subsequently, the resultant substrate was post-baked for 30 minutes in a clean oven at a temperature of 230° C., thereby forming a colored coated film of each color. The film thickness of the dried coated film was 2.0 μm in all cases.

g) Measurements of Chromaticity of Colored Coated Film, Spectral Transmittance, Perpendicular Optical Retardation, and Contrast (Chromaticity and Spectral Transmittance)

The chromaticity in a chromaticity diagram for an XYZ color specification system was measured by making use of a spectrophotometer ("OSP-200"; Olympus Co., Ltd.). The chromaticity values of each of the colored coated films which were manufactured by making use of each of the color resists shown in above Table 4 are shown in the following Table 7.

(Value Rth of Perpendicular Optical Retardation)

The values of perpendicular optical retardation were determined as follows. Namely, by making use of a spectroellipsometer (M-220 (trade name); Nippon Bunko Co., Ltd.), the coated film was measured from the direction which was angled at 45° from the normal direction of the substrate having a coated film formed thereon at intervals in wavelength of 5 nm in the range of 400 nm to 700 nm to obtain an ellipso-parameter δ. By making use of equation $\Delta = \delta/360 \times \lambda$, the value of optical retardation $\Delta(\lambda)$ was calculated. Then, by making use of this value, the three-dimensional refractive

TABLE 4

| | | RR-1 | RR-2 | RR-3 | RR-4 | RR-5 | GR-1 | GR-2 |
|---|---|---|---|---|---|---|---|---|
| | | | | Resist | | | | |
| | | | | Pigment dispersion | | | | |
| | | RP-1 | RP-1 | RP-2 | RP-3 | RP-3 | GP-1 | GP-1 |
| Retardation-regulating agent | | — | Melamine 12.0 | — | — | Porphrin 12.0 | — | Melamine 8.0 |
| Composition | Pigment dispersion | 36.0 | 36.0 | 36.0 | 36.0 | 36.0 | 45.0 | 45.0 |
| | Acrylic resin solution | 12.0 | — | 12.0 | 12.0 | — | 8.0 | — |
| | Monomer | 4.0 | 4.0 | 4.0 | 4.0 | 4.0 | 4.8 | 4.8 |
| | Photo polymerization initiator | 3.4 | 3.4 | 3.4 | 3.4 | 3.4 | 2.8 | 2.8 |
| | Sensitizer | 0.4 | 0.4 | 0.4 | 0.4 | 0.4 | 0.2 | 0.2 |
| | Organic solvent | 44.2 | 44.2 | 44.2 | 44.2 | 44.2 | 39.2 | 39.2 |
| | Total | 100.0 | 100.0 | 100.0 | 100.0 | 100.0 | 100.0 | 100.0 |

| | | GR-3 | GR-4 | GR-5 | GR-6 | GR-7 | BR-1 | BR-2 |
|---|---|---|---|---|---|---|---|---|
| | | | | Resist | | | | |
| | | | | Pigment dispersion | | | | |
| | | GP-1 | GP-2 | GP-2 | GP-2 | GP-2 | BP-1 | BP-1 |
| Retardation-regulating agent | | Polymeric LC 8.0 | — | Melamine 8.0 | Epoxy 8.0 | Porphyrin 8.0 | — | Melamine 10.0 |
| Composition | Pigment dispersion | 45.0 | 45.0 | 45.0 | 45.0 | 45.0 | 32.0 | 32.0 |
| | Acrylic resin solution | — | 8.0 | — | — | — | 10.0 | — |
| | Monomer | 4.8 | 4.8 | 4.8 | 4.8 | 4.8 | 5.6 | 5.6 |
| | Photo polymerization initiator | 2.8 | 2.8 | 2.8 | 2.8 | 2.8 | 2.0 | 2.0 |
| | Sensitizer | 0.2 | 0.2 | 0.2 | 0.2 | 0.2 | 0.2 | 0.2 |
| | Organic solvent | 39.2 | 39.2 | 39.2 | 39.2 | 39.2 | 50.2 | 50.2 |
| | Total | 100.0 | 100.0 | 100.0 | 100.0 | 100.0 | 100.0 | 100.0 | f) Manufacture of the Coated Films of Various Colors

By means of spin coating, each of the color resists shown in above Table 4 was coated on the surface of a glass substrate and then pre-baked for 20 minutes in a clean oven at a temperature of 70° C. Then, after being cooled to room temperaindex was calculated and the value Rth of perpendicular optical retardation was calculated from the following equation. In this case, a wavelength of 610 nm was used for the red colored pixel, a wavelength of 550 nm was used for the green colored pixel, and a wavelength of 450 nm was used for the blue colored pixel.

$$Rth = \{(Nx+Ny)/2 - Nz\} \times d$$

wherein Nx is a refractive index in the direction of x in the plane of the colored pixel; Ny is a refractive index in the direction of y in the plane of the colored pixel; and Nz is a refractive index in the thickness-wise direction of the colored pixel; Nx being defined as a lagging axis represented by $Nx \geq Ny$; and d is the thickness (nm) of a colored pixel.

The following Table 5 illustrates the value Rth of perpendicular optical retardation of each colored coated film manufactured by making use of each of the color resists shown in above Table 4.

(Contrast)

A polarizing plate was laminated on the opposite surfaces of the substrate having coated films formed thereon and then the luminance of light (Lp) under the condition where these polarizing plates are disposed parallel with each other was compared with the luminance of light (Lc) under the condition where these polarizing plates are disposed to intersect orthogonally with each other to obtain the ratio of Lp/Lc, thereby calculating the contrast (C).

Then, by making use of a basic substrate having no colored pixel formed thereon, the contrast (CS) was measured, thereby enabling the ratio of C/CS to be used for the normalization. Incidentally, the luminance was measured by making use of a color luminance meter ("BM-5A"; Topcon Co., Ltd.) under the condition of a 2° viewing angle. As for the polarizing plate, "NPF-SEG1224DU" (Nitto Denko Co., Ltd.) was employed. Table 5 shows the contrast of each of the colored coated films which were manufactured by making use of each of the color resists shown in Table 4 above.

matrix formed thereon in advance and then pre-baked for 20 minutes in a clean oven at a temperature of 70° C. Then, after being cooled to room temperature, the substrate was exposed, through a photomask, to ultraviolet rays by making use of an ultra-high pressure mercury lamp.

Thereafter, the resultant substrate was subjected to spray development by making use of an aqueous solution of sodium carbonate heated up to 23° C., after which the resultant substrate was washed with ion-exchange water and air-dried. Further, the resultant substrate was post-baked for 30 minutes in a clean oven at a temperature of 230° C., thereby forming a red colored pixel having a stripe-like configuration on the substrate.

Next, by making use of a green resist (GR-3), the green colored pixel was coated on the surface of the substrate in the same manner as described above and, further, by making use of a blue resist (BR-1), the blue colored pixel was coated on the surface of the substrate in the same manner as described above, thereby obtaining a color filter. The film thickness of each of these colored pixels was 2.0 μm in all cases.

Example 2

A color filter was obtained by repeating the same procedures as described in Example 1 except that the green resist was changed to (GR-6) from (GR-3).

Example 3

A color filter was obtained by repeating the same procedures as described in Example 1 except that the red resist was changed to (RR-2) from (RR-1) and the green resist was changed to (GR-2) from (GR-3).

Example 4

A color filter was obtained by repeating the same procedures as described in Example 1 except that the red resist was

TABLE 5

| | | Resist coating | | | | | | |
| --- | --- | --- | --- | --- | --- | --- | --- | --- |
| | | RR-1 | RR-2 | RR-3 | RR-4 | RR-5 | GR-1 | GR-2 |
| CIE chromaticity | x | 0.652 | 0.651 | 0.649 | 0.649 | 0.649 | 0.279 | 0.278 |
| (C light source) | y | 0.330 | 0.329 | 0.328 | 0.329 | 0.329 | 0.601 | 0.598 |
| | Y | 19.5 | 19.7 | 18.6 | 19.6 | 19.6 | 53.3 | 54.9 |
| C/CS | | 0.31 | 0.32 | 0.55 | 0.96 | 0.95 | 0.40 | 0.41 |
| Contrast | | 2520 | 2560 | 7250 | 9500 | 9410 | 4540 | 4560 |
| Rth | | −10 | 10 | 25 | −8 | 10 | −22 | 6 |

| | | Resist coating | | | | | | |
| --- | --- | --- | --- | --- | --- | --- | --- | --- |
| | | GR-3 | GR-4 | GR-5 | GR-6 | GR-7 | BR-1 | BR-2 |
| CIE chromaticity | x | 0.278 | 0.281 | 0.278 | 0.278 | 0.278 | 0.136 | 0.136 |
| (C light source) | y | 0.600 | 0.600 | 0.598 | 0.598 | 0.598 | 0.103 | 0.103 |
| | Y | 54.5 | 55.3 | 50.2 | 50.2 | 50.2 | 11.8 | 11.7 |
| C/CS | | 0.39 | 0.63 | 0.65 | 0.63 | 0.62 | 0.50 | 0.51 |
| Contrast | | 4350 | 7650 | 7760 | 7620 | 7580 | 7250 | 7320 |
| Rth | | 2 | −21 | 6 | −5 | 8 | 4 | 16 | h) Manufacture of Color Filter

The color filters were manufactured through a combination of color resists shown in Table 4 above and by the method described below.

Example 1

First of all, by means of spin coating, a red resist (RR-1) was coated on the surface of a glass substrate having a black changed to (RR-3) from (RR-1) and the green resist was changed to (GR-2) from (GR-3).

Example 5

A color filter was obtained by repeating the same procedures as described in Example 1 except that the red resist was changed to (RR-3) from (RR-1) and the green resist was changed to (GR-5) from (GR-3).

Example 6

A color filter was obtained by repeating the same procedures as described in Example 1 except that the red resist was changed to (RR-4) from (RR-1).

Example 7

A color filter was obtained by repeating the same procedures as described in Example 1 except that the red resist was changed to (RR-5) from (RR-1) and the green resist was changed to (GR-2) from (GR-3).

Example 8

A color filter was obtained by repeating the same procedures as described in Example 1 except that the red resist was changed to (RR-4) from (RR-1) and the green resist was changed to (GR-6) from (GR-3).

Example 9

A color filter was obtained by repeating the same procedures as described in Example 1 except that the red resist was changed to (RR-5) from (RR-1) and the green resist was changed to (GR-7) from (GR-3).

Example 10

A color filter was obtained by repeating the same procedures as described in Example 1 except that the red resist was changed to (RR-4) from (RR-1), the green resist was changed to (GR-7) from (GR-3) and the blue resist was changed to (BR-2) from (BR-1).

Comparative Example 1

A color filter was obtained by repeating the same procedures as described in Example 1 except that the green resist was changed to (GR-1) from (GR-3).

Comparative Example 1

A color filter was obtained by repeating the same procedures as described in Example 1 except that the green resist was changed to (GR-1) from (GR-3).

Comparative Example 2

A color filter was obtained by repeating the same procedures as described in Example 1 except that the green resist was changed to (GR-4) from (GR-3).

Comparative Example 3

A color filter was obtained by repeating the same procedures as described in Example 1 except that the red resist was changed to (RR-2) from (RR-1), and the green resist was changed to (GR-1) from (GR-3).

Comparative Example 4

A color filter was obtained by repeating the same procedures as described in Example 1 except that the red resist was changed to (RR-2) from (RR-1), and the green resist was changed to (GR-4) from (GR-3).

Comparative Example 5

A color filter was obtained by repeating the same procedures as described in Example 1 except that the red resist was changed to (RR-3) from (RR-1), and the green resist was changed to (GR-1) from (GR-3).

Comparative Example 6

A color filter was obtained by repeating the same procedures as described in Example 1 except that the red resist was changed to (RR-3) from (RR-1), and the green resist was changed to (GR-4) from (GR-3).

i) Manufacture of a Liquid Crystal Display Device

A transparent ITO electrode layer was formed on the color filter obtained as described above and then a polyimide alignment layer was formed on the ITO electrode layer. Further, a polarizing plate was formed on the opposite surface of the glass substrate.

On the other hand, a TFT array and pixel electrodes were formed on one surface of another (second) glass substrate and a polarizing plate was formed on the opposite surface of this glass substrate. Two glass substrates thus prepared were positioned face to face so as to make the electrode layers thereof face each other. Then, these glass substrates were aligned with each other while securing a predetermined gap between them by making use of spacer beads, and then the outer circumference of this composite body of substrates was entirely sealed while leaving an opening for injecting a liquid crystal composition.

Thereafter, a liquid crystal composition was injected, via the opening, into the gap and then the opening was closed. The polarizing plate was furnished with an optical compensation layer which was optimized so as to realize a wide angle view-field display. The liquid crystal display device thus manufactured was assembled with a backlight unit to obtain a liquid crystal panel.

j) Assessment of Visibility of Liquid Crystal Display Device on the Occasion of Displaying Black Color The liquid crystal display device manufactured as described above was operated so as to display a black color and the amount of the light leaked out from the liquid crystal panel (orthogonally permeated light; leaked light) in the normal direction (front) of the liquid crystal panel and in a slanted direction which was inclined by 45° from the normal direction (oblique angle) was visually observed. The assessment ranking was as follows, the results being illustrated in the following Table 6.

TABLE 6

| | Resist | | | Rth | | | C/CS | | | Visibility at black display | |
|---|---|---|---|---|---|---|---|---|---|---|---|
| | Red | Green | Blue | R | G | B | R | | G | | B | Front | Oblique |
| Ex. 1 | RR-1 | GR-3 | BR-1 | −10 | 2 | 4 | 0.31 | X | 0.39 | X | 0.50 ○ | X | ○ |
| Ex. 2 | RR-1 | GR-6 | BR-1 | −10 | −5 | 4 | 0.31 | X | 0.62 | ○ | 0.50 ○ | Δ | ○ |
| Ex. 3 | RR-2 | GR-2 | BR-1 | 10 | 6 | 4 | 0.32 | X | 0.41 | X | 0.50 ○ | X | ○ |
| Ex. 4 | RR-3 | GR-2 | BR-1 | 25 | 6 | 4 | 0.55 | ○ | 0.41 | X | 0.50 ○ | Δ | ○ |
| Ex. 5 | RR-3 | GR-5 | BR-1 | 25 | 6 | 4 | 0.55 | ○ | 0.65 | ○ | 0.50 ○ | ○ | ○ |
| Ex. 6 | RR-4 | GR-3 | BR-1 | −8 | 2 | 4 | 0.96 | ○ | 0.39 | X | 0.50 ○ | Δ | ○ |

TABLE 6-continued

| | Resist | | | Rth | | | C/CS | | | | | | Visibility at black display | |
|---|---|---|---|---|---|---|---|---|---|---|---|---|---|---|
| | Red | Green | Blue | R | G | B | R | | G | | B | | Front | Oblique |
| Ex. 7 | RR-5 | GR-2 | BR-1 | 10 | 6 | 4 | 0.95 | ○ | 0.41 | X | 0.50 | ○ | Δ | ○ |
| Ex. 8 | RR-4 | GR-6 | BR-1 | −8 | −5 | 4 | 0.96 | ○ | 0.63 | ○ | 0.50 | ○ | ○ | ○ |
| Ex. 9 | RR-5 | GR-7 | BR-1 | 10 | 8 | 4 | 0.95 | ○ | 0.62 | ○ | 0.50 | ○ | ○ | ○ |
| Ex. 10 | RR-4 | GR-7 | BR-2 | −8 | 8 | 16 | 0.96 | ○ | 0.62 | ○ | 0.51 | ○ | ○ | ○ |
| Comp. Ex. 1 | RR-1 | GR-1 | BR-1 | −10 | −22 | 4 | 0.31 | X | 0.40 | X | 0.50 | ○ | X | X |
| Comp. Ex. 2 | RR-1 | GR-4 | BR-1 | −10 | −21 | 4 | 0.31 | X | 0.63 | ○ | 0.50 | ○ | Δ | X |
| Comp. Ex. 3 | RR-2 | GR-1 | BR-1 | 25 | −22 | 4 | 0.32 | X | 0.40 | X | 0.50 | ○ | X | X |
| Comp. Ex. 4 | RR-2 | GR-4 | BR-1 | 25 | −21 | 4 | 0.32 | X | 0.63 | ○ | 0.50 | ○ | Δ | X |
| Comp. Ex. 5 | RR-3 | GR-1 | BR-1 | −8 | −22 | 4 | 0.55 | ○ | 0.40 | X | 0.50 | ○ | Δ | X |
| Comp. Ex. 6 | RR-3 | GR-4 | BR-1 | −8 | −21 | 4 | 0.55 | ○ | 0.63 | ○ | 0.50 | ○ | ○ | X |

○: Excellent
Δ: Good
X: Bad

It can be seen from Table 6 above that the color filters obtained in Examples 1 through 9 were employed in a liquid crystal display device, thus proving it is possible to obtain a liquid crystal display device which is excellent in oblique visibility.

Further, in the cases of the color filters of Examples 5, 8 and 9, since it was made possible to obtain an enhanced contrast when observed from the front of the panel, it was possible to obtain a liquid crystal display device which was excellent in visibility also in the axial direction of the panel.

Whereas, in the cases of the color filters obtained in Comparative Examples 1 through 6, since the balance of perpendicular optical retardation was poor among the red pixel, the green pixel and blue pixel, color shift was caused to generate when observed in the oblique direction, thus deteriorating the oblique visibility thereof.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A coloring composition for a color filter of a liquid crystal display device, the color filter including colored pixels of at least two colors, the coloring composition for colored pixels of one of the colors comprising:
   a transparent resin;
   an organic pigment dispersed in the transparent resin; and
   a retardation regulating agent dispersed in the transparent resin and containing a compound which is capable of increasing a retardation of the color in a thickness direction in a sufficient amount to minimize a difference in retardation among colored pixels,
   wherein a contrast C represented from the following equation is not less than 3000, $C = Lp/Lc$ wherein Lp is the luminance of light measured by means of a luminance meter as the light is passed through a laminated structure consisting of a pair of polarizing plates with a coated film of the coloring composition of single color deposited on a transparent substrate being sandwiched therebetween after a backlight is applied to one of the polarizing plates and permitted to emit from the other of the polarizing plates under a condition wherein axes of these polarizing plates are parallel with each other; and Lc is the luminance of light measured under the same conditions as described above except that axes of these polarizing plates are orthogonal to each other.

2. A coloring composition for a color filter of a liquid crystal display device, the color filter including colored pixels of at least two colors, the coloring composition for colored pixels of one of the colors comprising:
   a transparent resin;
   an organic pigment dispersed in the transparent resin; and
   a retardation regulating agent dispersed in the transparent resin and containing a compound which is capable of increasing a retardation of the color in a thickness direction in a sufficient amount to minimize a difference in retardation among colored pixels,
   wherein a ratio of a contrast C to a contrast CS is not less than 0.45, the contrast C is represented the following equation, $C = Lp/Lc$ wherein Lp is the luminance of light measured by means of a luminance meter as the light is passed through a laminated structure consisting of a pair of polarizing plates with a coated film of the coloring composition of single color deposited on a transparent substrate being sandwiched therebetween after a backlight is applied to one of the polarizing plates and permitted to emit from the other of the polarizing plates under a condition wherein axes of these polarizing plates are parallel with each other; and Lc is the luminance of light measured under the same conditions as described above except that axes of these polarizing plates are orthogonal to each other, and the contrast CS is a value measured under the same conditions as described above except that the transparent substrate without the coated film of the coloring composition is sandwiched between said pair of polarizing plates.

3. The coloring composition according to claim 1 or 2, wherein the retardation-regulating agent is an organic compound having a planar structure functional group with at least one cross-linking group.

4. The coloring composition according to claim 3, wherein the organic compound is at least one compound selected from the group consisting of melamine compounds, porphyrin compounds, epoxy compounds and polymeric liquid crystal compounds.

5. The coloring composition according to claim 1 or 2, wherein the organic pigment is selected from those having an average primary particle diameter ranging from 5 to 40 nm.

* * * * *